United States Patent
Marrone et al.

(10) Patent No.: US 11,070,594 B1
(45) Date of Patent: Jul. 20, 2021

(54) APPLYING OVERLAY NETWORK POLICY BASED ON USERS

(71) Applicant: Tempered Networks, Inc., Seattle, WA (US)

(72) Inventors: Nicholas Anthony Marrone, Seattle, WA (US); Bryan David Skene, Seattle, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 17/084,557

(22) Filed: Oct. 29, 2020

Related U.S. Application Data

(60) Provisional application No. 63/093,041, filed on Oct. 16, 2020.

(51) Int. Cl.
*H04L 29/06* (2006.01)
*H04L 12/66* (2006.01)

(52) U.S. Cl.
CPC .......... *H04L 63/205* (2013.01); *H04L 12/66* (2013.01); *H04L 63/102* (2013.01); *H04L 63/104* (2013.01); *H04L 63/108* (2013.01)

(58) Field of Classification Search
CPC ... H04L 63/205; H04L 63/102; H04L 63/104; H04L 63/108
See application file for complete search history.

(56) References Cited

U.S. PATENT DOCUMENTS

| 5,835,727 | A | 11/1998 | Wong et al. |
| 6,158,010 | A | 12/2000 | Moriconi et al. |
| 6,981,156 | B1 | 12/2005 | Stern et al. |
| 7,209,956 | B2 | 4/2007 | Mache |

(Continued)

FOREIGN PATENT DOCUMENTS

| WO | 2007038872 A1 | 4/2007 |
| WO | 2008039506 A2 | 4/2008 |

(Continued)

OTHER PUBLICATIONS

Office Communication for U.S. Appl. No. 17/079,248 dated Jan. 7, 2021, pp. 1-10.

(Continued)

*Primary Examiner* — Kambiz Zand
*Assistant Examiner* — Arezoo Sherkat
(74) *Attorney, Agent, or Firm* — John W. Branch; Branch Partners PLLC

(57) ABSTRACT

Embodiments are directed to managing communication. Credentials of a user may be provided to an authorization service such that the authorization service authenticates the user as a member of authorization groups and such that the user may be associated with a gateway on an overlay network. The authorization groups may be compared with user groups to associate the user with one or more user group. The gateway may be associated with one or more resource group based on the user groups. Policy information may be generated for the gateway based on each resource group. The policy information may be provided to the gateway to define policies associated with resources in the overlay network. The policy information may be enforced against source nodes providing overlay traffic directed to target nodes in the overlay network.

24 Claims, 13 Drawing Sheets

(56) References Cited

U.S. PATENT DOCUMENTS

| | | |
|---|---|---|
| 7,324,533 B1 | 1/2008 | DeLiberato et al. |
| 7,373,660 B1 | 5/2008 | Guichard et al. |
| 7,395,349 B1 | 7/2008 | Szabo et al. |
| 7,796,593 B1 | 9/2010 | Ghosh et al. |
| 7,881,199 B2 | 2/2011 | Krstulich |
| 7,996,894 B1 | 8/2011 | Chen et al. |
| 8,224,971 B1 | 7/2012 | Miller et al. |
| 8,429,400 B2 | 4/2013 | Khalid et al. |
| 8,489,701 B2 | 7/2013 | Manion et al. |
| 8,607,301 B2 | 12/2013 | Carrasco |
| 8,630,183 B2 | 1/2014 | Miyata |
| 8,832,211 B1 | 9/2014 | Lebedev et al. |
| 8,886,827 B2 | 11/2014 | Goel et al. |
| 8,959,513 B1 | 2/2015 | Swaminathan |
| 9,264,522 B1 | 2/2016 | Reeves et al. |
| 9,774,586 B1 * | 9/2017 | Roche ................. G06F 21/6218 |
| 10,158,545 B1 | 12/2018 | Marrone et al. |
| 2002/0026532 A1 | 2/2002 | Maeda et al. |
| 2002/0073182 A1 | 6/2002 | Zakurdaev et al. |
| 2002/0143855 A1 | 10/2002 | Traversat et al. |
| 2003/0061479 A1 | 3/2003 | Kimura |
| 2003/0081620 A1 | 5/2003 | Danner et al. |
| 2003/0123436 A1 | 7/2003 | Joseph et al. |
| 2004/0024905 A1 | 2/2004 | Liao et al. |
| 2004/0143628 A1 | 7/2004 | Bradford et al. |
| 2004/0268121 A1 | 12/2004 | Shelest et al. |
| 2005/0014500 A1 | 1/2005 | Muhonen et al. |
| 2005/0052999 A1 | 3/2005 | Oliver et al. |
| 2005/0265355 A1 | 12/2005 | Havala et al. |
| 2006/0190458 A1 | 8/2006 | Mishina et al. |
| 2007/0019641 A1 | 1/2007 | Pai et al. |
| 2007/0081530 A1 | 4/2007 | Nomura et al. |
| 2007/0226781 A1 | 9/2007 | Chen et al. |
| 2007/0230352 A1 | 10/2007 | Kokku et al. |
| 2007/0258440 A1 | 11/2007 | Watanabe |
| 2008/0072282 A1 | 3/2008 | Willis et al. |
| 2008/0082823 A1 | 4/2008 | Starrett et al. |
| 2008/0151916 A1 | 6/2008 | Jetcheva et al. |
| 2008/0232360 A1 | 9/2008 | Mihaly et al. |
| 2008/0288614 A1 | 11/2008 | Gil et al. |
| 2008/0307519 A1 | 12/2008 | Curcio et al. |
| 2009/0010168 A1 | 1/2009 | Yurchenko et al. |
| 2009/0034738 A1 | 2/2009 | Starrett |
| 2009/0059906 A1 | 3/2009 | Cullen |
| 2009/0129374 A1 | 5/2009 | Yurchenko et al. |
| 2009/0210518 A1 | 8/2009 | Verma et al. |
| 2009/0210541 A1 * | 8/2009 | Chandolu ............. H04L 63/104 |
| | | 709/229 |
| 2009/0310518 A1 | 12/2009 | Jayaram et al. |
| 2010/0014533 A1 | 1/2010 | Hirano et al. |
| 2010/0024026 A1 | 1/2010 | Ylonen et al. |
| 2010/0027442 A1 | 2/2010 | Chockler et al. |
| 2010/0042747 A1 | 2/2010 | Hascalovici et al. |
| 2010/0214959 A1 | 8/2010 | Kuehnel et al. |
| 2010/0218235 A1 | 8/2010 | Ganot |
| 2010/0254395 A1 | 10/2010 | Smith et al. |
| 2011/0016509 A1 | 1/2011 | Huang et al. |
| 2011/0035466 A1 | 2/2011 | Panigrahi |
| 2011/0090892 A1 | 4/2011 | Cooke |
| 2011/0103393 A1 | 5/2011 | Meier et al. |
| 2011/0141881 A1 | 6/2011 | Joshi et al. |
| 2012/0110203 A1 | 5/2012 | Ozawa |
| 2012/0163196 A1 | 6/2012 | Jansen et al. |
| 2012/0304243 A1 | 11/2012 | Li et al. |
| 2013/0018993 A1 | 1/2013 | Hui et al. |
| 2013/0046414 A1 | 2/2013 | Ree |
| 2013/0083725 A1 | 4/2013 | Mallya et al. |
| 2013/0198830 A1 | 8/2013 | Nemoto et al. |
| 2013/0254264 A1 | 9/2013 | Hankinson et al. |
| 2013/0283364 A1 | 10/2013 | Chang et al. |
| 2014/0026207 A1 | 1/2014 | Wang et al. |
| 2014/0133354 A1 | 5/2014 | Scharf et al. |
| 2014/0150070 A1 | 5/2014 | Peterson |
| 2014/0223507 A1 | 8/2014 | Xu |
| 2014/0282817 A1 * | 9/2014 | Singer ..................... H04L 63/08 |
| | | 726/1 |
| 2014/0282850 A1 | 9/2014 | Mattes et al. |
| 2014/0307744 A1 | 10/2014 | Dunbar et al. |
| 2014/0348131 A1 | 11/2014 | Duan et al. |
| 2015/0024677 A1 | 1/2015 | Gopal et al. |
| 2015/0046997 A1 | 2/2015 | Gupta et al. |
| 2015/0057766 A1 | 2/2015 | Ejiri et al. |
| 2015/0067033 A1 | 3/2015 | Martinsen et al. |
| 2015/0124823 A1 | 5/2015 | Pani et al. |
| 2015/0135259 A1 | 5/2015 | Ilyadis et al. |
| 2015/0281074 A1 | 10/2015 | Kubota |
| 2015/0365316 A1 | 12/2015 | Liao et al. |
| 2015/0372828 A1 | 12/2015 | Hao et al. |
| 2016/0028624 A1 | 1/2016 | Song et al. |
| 2016/0036861 A1 | 2/2016 | Mattes et al. |
| 2016/0149804 A1 | 5/2016 | Mirza |
| 2016/0255542 A1 | 9/2016 | Hughes et al. |
| 2016/0261641 A1 | 9/2016 | Mattes et al. |
| 2017/0019430 A1 | 1/2017 | Cohn |
| 2017/0238215 A1 | 8/2017 | Jin |
| 2017/0373936 A1 * | 12/2017 | Hooda ..................... H04L 63/08 |
| 2018/0083968 A1 | 3/2018 | Xu et al. |
| 2018/0124183 A1 | 5/2018 | Kozat et al. |
| 2018/0234459 A1 * | 8/2018 | Kung ................. H04L 63/0263 |
| 2019/0149401 A1 | 5/2019 | Ramachandran et al. |
| 2019/0394107 A1 | 12/2019 | Marrone et al. |
| 2020/0067341 A1 | 2/2020 | Glover et al. |
| 2021/0084048 A1 * | 3/2021 | Kannan ................. H04L 63/104 |

FOREIGN PATENT DOCUMENTS

| | | | | |
|---|---|---|---|---|
| WO | WO-2011159842 A2 * | 12/2011 | ......... | G06F 21/6218 |
| WO | WO-2019246331 A1 * | 12/2019 | ......... | H04L 63/0272 |

OTHER PUBLICATIONS

International Search Report and Written Opinion for International Patent Application No. PCT/US2014/023632 dated Jun. 23, 2014, pp. 1-15.

Asguard Networks, Inc., "SimpleConnectTM Product Information," Retrieved on Nov. 9, 2012, from http://www.asguardnetworks.com/product/, p.1.

Asguard Networks, Inc., "Welcome to Asguard Networks," Retrieved on Oct. 23, 2012, from http://www.asguardnetworks.com/, p. 1.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news/, pp. 1-2.

Trusted Computing Group, Incorporated, "TCG Trusted Network Connect: IF-MAP Metadata for ICS Security," Specification Version 1.0, Revision 44, May 8, 2014, pp. 1-64.

Office Communication for U.S. Appl. No. 14/204,907 dated Jul. 10, 2015, pp. 1-20.

Aoyagi, S. et al., "ELA: A Fully Distributed VPN System Over Peer-to-Peer Network," Proceedings of the 2005 Symposium on Applications and the Internet, 2005, IEEE, Computer Society, pp. 1-4.

Benyamina, D. et al., "Wireless Mesh Networks Design—A Survey," IEEE Communications Survey & Tutorials, vol. 14, No. 2, Second Quarter 2012, pp. 299-310.

Office Communication for U.S. Appl. No. 14/740,053 dated Jul. 29, 2015, pp. 1-10.

International Search Report and Written Opinion for International Patent Application No. PCT/US2015/042993 dated Nov. 11, 2015, pp. 1-11.

Office Communication for U.S. Appl. No. 14/814,283 dated Nov. 30, 2015, pp. 1-8.

(56) References Cited

OTHER PUBLICATIONS

Office Communication for U.S. Patent Application No. 14/204,907 dated Dec. 2, 2015, pp. 1-14.
Office Communication for U.S. Appl. No. 14/740,053 dated Jan. 21, 2016, pp. 1-18.
Office Communication for U.S. Appl. No. 14/204,907 dated Feb. 24, 2016, pp. 1-14.
Office Communication for U.S. Appl. No. 14/814,283 dated Jun. 3, 2016, pp. 1-10.
Office Communication for U.S. Appl. No. 15/083,214 dated Jul. 7, 2016, pp. 1-11.
Trusted Computing Group Architects Guide; ICS Security Using TNC Technology, Oct. 2013, pp. 1-6.
Office Communication for U.S. Appl. No. 15/156,254 dated Aug. 3, 2016, pp. 1-13.
Office Communication for U.S. Appl. No. 15/083,214 dated Oct. 25, 2016, pp. 1-11.
Office Communication for U.S. Appl. No. 15/201,063 dated Nov. 2, 2016, pp. 1-11.
Office Communication for U.S. Appl. No. 14/814,283 dated Nov. 21, 2016, pp. 1-10.
Office Communication for U.S. Appl. No. 15/156,254 dated Dec. 30, 2016, pp. 1-13.
Office Communication for U.S. Appl. No. 15/083,214 dated Jan. 9, 2017, pp. 1-6.
Office Communication for U.S. Appl. No. 15/083,214 dated Feb. 9, 2017, pp. 1-10.
Office Communication for U.S. Appl. No. 15/201,063 dated Apr. 21, 2017, pp. 1-14.
Office Communication for U.S. Appl. No. 15/156,254 dated May 5, 2017, pp. 1-13.
Office Communication for U.S. Appl. No. 14/814,283 dated Jun. 9, 2017, pp. 1-18.
Office Communication for U.S. Appl. No. 15/156,254 dated Oct. 19, 2017, pp. 1-13.
Lawton, G., "Machine-to-Machine Technology gears up for growth", 2004, IEEE Computer Society, pp. 12-15.
Office Communication for U.S. Appl. No. 15/670,925 dated Apr. 5, 2018, pp. 1-10.
Office Communication for U.S. Appl. No. 15/156,254 dated May 14, 2018, pp. 1-19.
Office Communication for U.S. Appl. No. 15/670,859 dated Jun. 29, 2018, pp. 1-10.
Office Communication for U.S. Appl. No. 15/924,148 dated Jun. 5, 2018, pp. 1-13.
Office Communication for U.S. Appl. No. 15/987,762 dated Sep. 12, 2018, pp. 1-13.
Office Communication for U.S. Appl. No. 15/994,760 dated Oct. 1, 2018, pp. 1-10.
Office Communication for U.S. Appl. No. 15/670,859 dated Nov. 26, 2018, pp. 1-11.
Office Communication for U.S. Appl. No. 14/814,283 dated Aug. 23, 2016, pp. 1-8.
Office Communication for U.S. Appl. No. 16/562,258 dated Oct. 22, 2019, pp. 1-5.
Office Communication for U.S. Appl. No. 16/267,166 dated Jan. 14, 2020, pp. 1-5.
Office Communication for U.S. Appl. No. 16/172,621 dated Mar. 17, 2020, pp. 1-7.
Office Communication for U.S. Appl. No. 16/221,145 dated Apr. 13, 2020, pp. 1-7.
Office Communication for U.S. Appl. No. 16/562,258 dated Apr. 7, 2020, pp. 1-10.
Office Communication for U.S. Appl. No. 16/172,621 dated Jul. 15, 2020, pp. 1-15.
Office Communication for U.S. Appl. No. 16/267,166 dated Jul. 22, 2020, pp. 1-8.
Office Communication for U.S. Appl. No. 16/562,258 dated Sep. 8, 2020, pp. 1-11.
Office Communication for U.S. Appl. No. 16/221,145 dated Sep. 10, 2020, pp. 1-11.
Office Communication for U.S. Appl. No. 16/913,114 dated Oct. 1, 2020, pp. 1-21.
Office Communication for U.S. Appl. No. 16/562,258 dated Nov. 20, 2020, pp. 1-5.
Office Communication for U.S. Appl. No. 16/221,145 dated Nov. 23, 2020, pp. 1-4.

* cited by examiner

# US 11,070,594 B1

APPLYING OVERLAY NETWORK POLICY BASED ON USERS

CROSS-REFERENCE TO RELATED APPLICATION

This application is a Utility patent application based on previously filed U.S. Provisional Patent Application No. 63/093,041 filed on Oct. 16, 2020, the benefit of the filing date of which is hereby claimed under 35 U.S.C. § 119(e) and which is further incorporated in entirety by reference.

TECHNICAL FIELD

The present invention relates generally to network management, and more particularly, but not exclusively, to managing communication over a network in which host identity is distinct from its topological location on a network.

BACKGROUND

Typical network communication protocols, such as, Internet Protocol (IP) deliver network packets from a source host to a destination host based on an IP address. Traditionally, IP addresses have served a dual purpose as a host's identity and location. This has led to challenges securing the various hosts and networks in modern distributed networking environments. For instance, network packets often include a source network address that may be used by the target host to address and route return packets. However, in some cases target hosts may use the source network address to determine the identity of the source host. In some cases, this dual use may cause networks or services to be vulnerable to man-in-the-middle attacks based on network packets that include false or spoofed network addresses. Other security challenges enabled in part by this dual role of network addresses may include denial of service attacks, replay attacks, or the like. Also, since modern computing environments often employ ephemeral and/or non-unique network addresses, using network address to provide host identity poses challenges, as modern hosts, e.g. cell phones, frequently change location on the network. Further, in some case, logging into a workstation or device on a network may be automatically grant users access to the same network resources as the workstation or device irrespective of the network policy. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
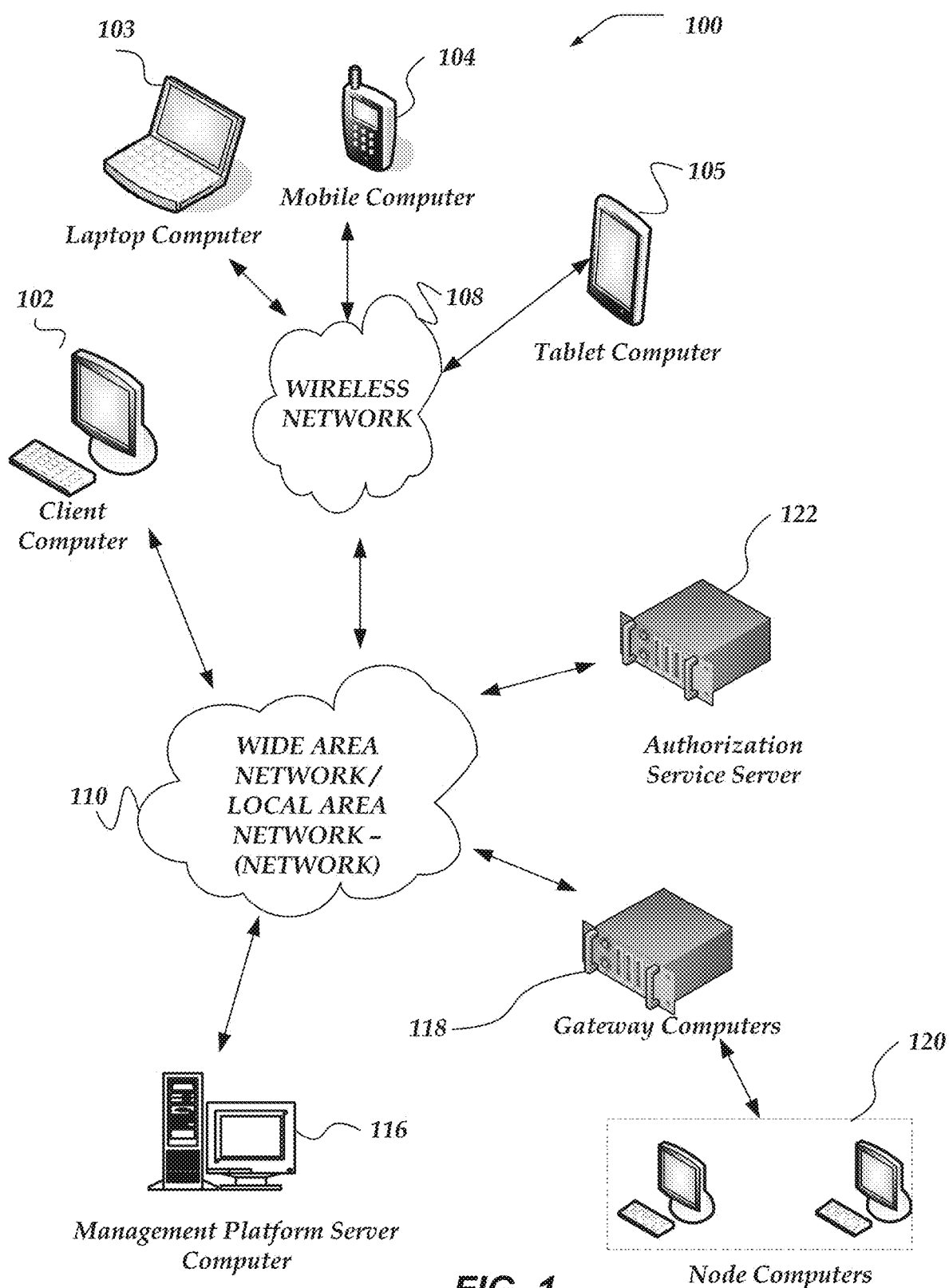
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "overlay network," "mesh network," "industrial network" refer to a network of industrial computer/machines, workstations, client computers, gateway computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as overlay networks even when their topology or configuration is not strictly a mesh network or partial mesh network.

As used herein the term "physical network" refers to the actual communication network that interconnects one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup an overlay network in an various environments. In some cases, physical networks may be arranged to enable open communication between node computers, (e.g., machines, workstations, client computers, and so on), gateway computers, management platform computers, relay computers, or the like, that are on the physical network.

As used herein the terms "node," and "node computer" refer to computers that are endpoint computers interconnected over a physical network. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers As used herein the term "node engine" refer to services, processes, applications, or the like, that are hosted on a computer or other device. Node engine may be considered similar to node computers except they installed or hosted on a computer rather being a separate standalone computer or appliance. In some cases, applications running on a computer that relies on an overlay network may be considered node engines because they may rely on gateways to gain access to the overlay network similar to node computers.

As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/overlay network. These intended recipients of these communication may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the physical network. Gateway computers may be network computers that may be arranged to provide security, access control, communication routing, or the like, for overlay networks or mesh networks. In some embodiments, gateway computers may be configured by another network computer, such as, a management platform computer.

As used herein the term "gateway engine" refers to a service, process, application, or the like, that may be installed or hosted on a computer or other device to provide the services of an overlay network gateway or gateway computer.

As used herein the term "relay computer", or "relay" refer to one or more computers that serve as intermediaries for establishing connections between gateway computers that may be on different networks. In some cases, relay computers may be associated with network addresses that may be reached from more than one network.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more identifiers that may be recognized by one or more protocols.

As used herein the term "device address" refers to an identifier that may be associated with a network interface. Device addresses may be employed by low level network protocols to communicate network traffic from one network interface to another. Accordingly, devices addresses may be used to send network traffic from one device to another device that are in the same physical network segment. The particular makeup or format of a device address may vary depending on the network protocol being employed. For example, MAC addresses may be used to devices in Ethernet networks, Wifi networks, or Bluetooth networks. Device addresses may be unsuitable for communicating between devices on different networks or different network segments for various reasons including an absence of routing information or network topology information.

As used herein the term "protocol address" refers to an endpoint identifier that may be associated with devices or interfaces. Protocol addresses may be used to send network packets to other interfaces in the same network segment or to interfaces in other network segments depending on the network protocol and network policies/configuration. Protocol address generally embed information that may be employed to determine a communication path across one or more devices to reach a target or destination device. For example, IP addresses may be considered protocol addresses because devices on different networks that support the IP protocol may communicate with devices on the same network or different network. Protocol addresses assume that a network stack, network devices, or network engines may be enabled to associate protocol addresses with device addresses. This enables the lower level interface-to-interface communication to determine which interface receives the network traffic without knowledge of the higher level transport protocols that may be operative in a network. In cases where an interface is trying to reach another interface in a different network segment usually by stepping up to high level protocol that can negotiate the traversal across the network segments. Also, in some networking environments, one or more services may be provided that enable the discovery of which device address to employ to reach an interface associated with a given protocol address. In some cases, there may be one or more intervening networks that require traversal before the network that includes a target interface may be reached. Accordingly, routing services may provide device addresses that represent a 'next hop' on a path to the target device.

As used herein the term "resource group" refers to a collection of one or more entities in an overlay group. Resources may be node computers. Overlay network policies may be associated with resource groups that include one or more node computers. Accordingly, policies for multiple node computers may be administered by setting policies for a resource group. In some cases, resource groups may be associated with rules, patterns, or the like, that may be employed to determine if a computer or device should be automatically included in a given group.

As used herein the term "resource tag" refers to an identifier associated with a resource group. Resource groups may be associated more than one resource tags. Resource tags may be strings, numbers, GUIDs, or the like. Resource tags may be associated with one or more overlay network policies that may be associated with computer/device members of resource groups.

As used herein the term "authorization service" refers to a service or application that organizations employ to provide centralized management of users. Authorization services may also provide authentication services that enable users to authenticate their identity using various credentials, such as, usernames, password, pass phrases, cryptographic certificates, tokens, two-factor authentication, or the like. If a user is authenticated, authorization services may provide various information regarding the resources, services, or the like, that the user is allowed to access. For example, conventional authorization services may include, Lightweight Directory Access Protocol (LDAP) services, Security Assertion Markup Language (SAML) services, Remote Authentication Dial-In User Service (RADIUS) services, Kerberos services, OpenID services, OAuth 2.0 services, or the like.

As used herein the term "authorization group" refers to a category or class of users defined by an authorization service. Typically, organization employ authorization groups to enable the privileges for categories or classes of users to be managed or administered at the same time rather than administering users individually. Authorization services often support arbitrary authorization group names or group membership as defined by an organization. A user may be included in more than one authorization group. Authorization services typically provide a list of authorization groups as part of a successful authentication of a user.

As used herein the term "user group" refers to a group or class of users as defined for an overlay network. One or more authorization groups may be mapped or otherwise associated with user groups. In some cases, user groups may be associated with one or more authorization group names that determine if the users in an authorization group are associated with a given user group.

As used herein the term "access tag" refers to an identifier associated with a user group. User groups may be associated more than one access tags. Access tags may be strings, numbers, GUIDs, or the like. Access tags may be configured to correspond or otherwise matching resource tags associated with resource groups. Accordingly, access tags may be employed associate user groups with resources groups based on match of access tags and resource tags.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over one or more networks. In one or more of the various embodiments, one or more credentials of a user may be provided to an authorization service on an underlay network such that the authorization service authenticates the user as a member of one or more authorization groups for the underlay network and such that the user may be associated with a gateway on an overlay network. In one or more of the various embodiments, the authorization service may be one or more of a Lightweight Directory Access Protocol (LDAP) service, a Security Assertion Markup Language (SAML) service, a Remote Authentication Dial-In User Service (RADIUS) service, a Kerberos-based service, an OpenID service, an OAuth service, or the like.

In one or more of the various embodiments, one or more user groups associated with the overlay network may be provided such that each user group may be associated with one or more access tags and such that the one or more user groups for the overlay network are separate from the one or more authorization groups for the underlay network.

In one or more of the various embodiments, one or more resource groups associated with one or more resources in the overlay network and one or more resource tags may be provided.

In one or more of the various embodiments, the one or more authorization groups may be compared with the one or more user groups to generate one or more first results based on an identifier of each authorization group.

In one or more of the various embodiments, the user may be associated with each user group that corresponds to each affirmative first result. In one or more of the various embodiments, associating the user with each user group that corresponds to each affirmative first result may include: associating the user with two or more user groups based on an association of each of the two or more user groups with a same authorization group; associating two or more authorization groups with a same user group based on an association of the two or more authorization groups with the same user group; or the like.

In one or more of the various embodiments, the one or more access tags of each user group associated with the user may be compared to the one or more resource tags associated with each resource group to generate one or more second results.

In one or more of the various embodiments, the gateway may be associated with each resource group that corresponds to the one or more affirmative second results. In one or more of the various embodiments, providing the one or more resource groups may include: determining one or more nodes to include in each resource group based on one or more rules, one or more patterns, or one or more lists that determine one or more nodes to include in each resource group such that including a node in a resource group includes the node in the overlay network and such that each resource group may be associated with overlay network policy information that defines the overlay network access privileges for each node included in the one or more resource groups.

In one or more of the various embodiments, policy information may be generated for the gateway based on each resource group that is associated with the gateway.

In one or more of the various embodiments, the policy information may be provided to the gateway to define one or more policies associated with the one or more resources in the overlay network.

In one or more of the various embodiments, in response to a source node associated with the gateway providing overlay traffic directed to a target node in the overlay network, enforcing the one or more policies.

In one or more of the various embodiments, an access time window may be associated with the one or more user groups.

In one or more of the various embodiments, in response to a current time being outside of the access window, further actions may be performed, including: determining one or more disqualified access tags based on the one or more access tags that are associated with the one or more user groups associated with the access time window; determining one or more disqualified resource groups based on the one or more resource tags that correspond to the one or more disqualified access tags; updating the policy information for the gateway based on the one or more disqualified resource groups; providing the updated policy information to the gateway over the underlay network; or the like.

In one or more of the various embodiments, the one or more credentials of the user may be provided to one or more other authorization services such that the one or more other authorization services authenticate the user as a member of one or more other authorization groups. And, in some embodiments, the one or more other authorization groups may be employed to determine or modify the one or more resource groups associated with the gateway.

In one or more of the various embodiments, one or more other credentials of another user may be provided to the authorization service such that the authorization service authenticates the other user as a member of one or more other authorization groups. In some embodiments, the one or more other authorization groups may be employed to determine one or more other resource groups associated with the gateway. In some embodiments, the policy information for the gateway may be updated based on the one or more other resource groups. And, in some embodiments, the updated policy information may be provided to the gateway. Further, in some embodiments, policies associated with a gateway computer may include restricting access to the gateway computer to one or more specific users.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, management platform server computer 116, gateway computers 118, node computers 120, authorization service server 122, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 122 represent one or more client computer, network computer, or network devices, or the like, that may be arranged to access networks via a gateway computer. Each node computer may be associated with a gateway computer that enable network access to other node computers, gateway computers, or the like. Node computers 122 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include overlay networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, node computers 120, authorization service server 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, node computers 120, or authorization service server 122 each as a single computer, the innovations or embodiments are not so limited. For example, one or more functions of management platform server computer 116, gateway computers 118, node computers 120, authorization service server 122, or the like, may be distributed across one or more distinct network computers. Moreover, management platform server computer 116, gateway computers 118, node computers 120, or authorization service server 122, are not limited to a particular configuration such as the one shown in FIG. 1. Thus, in one or more embodiments, management platform server computer 116, gateway computers 118, node computers 120, or authorization service server 122, may be implemented using a plurality of network computers. In other embodiments, management platform server computer 116, gateway computers 118, node computers 120, authorization service server 122, may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, node computers 120, authorization service server 122, or the like. Further, in at least one of the various embodiments, management platform server computer 116, gateway computers 118, node computers 120, authorization service server 122, may be implemented using one or more cloud instances in one or more cloud computing environments. Likewise, in at least one of the various embodiments, management platform server computer 116, gateway computers 118, node computers 120, authorization service server 122, may be implemented using one or more container instances in one or more container computers environments.

Illustrative Client Computer

Figure 2:
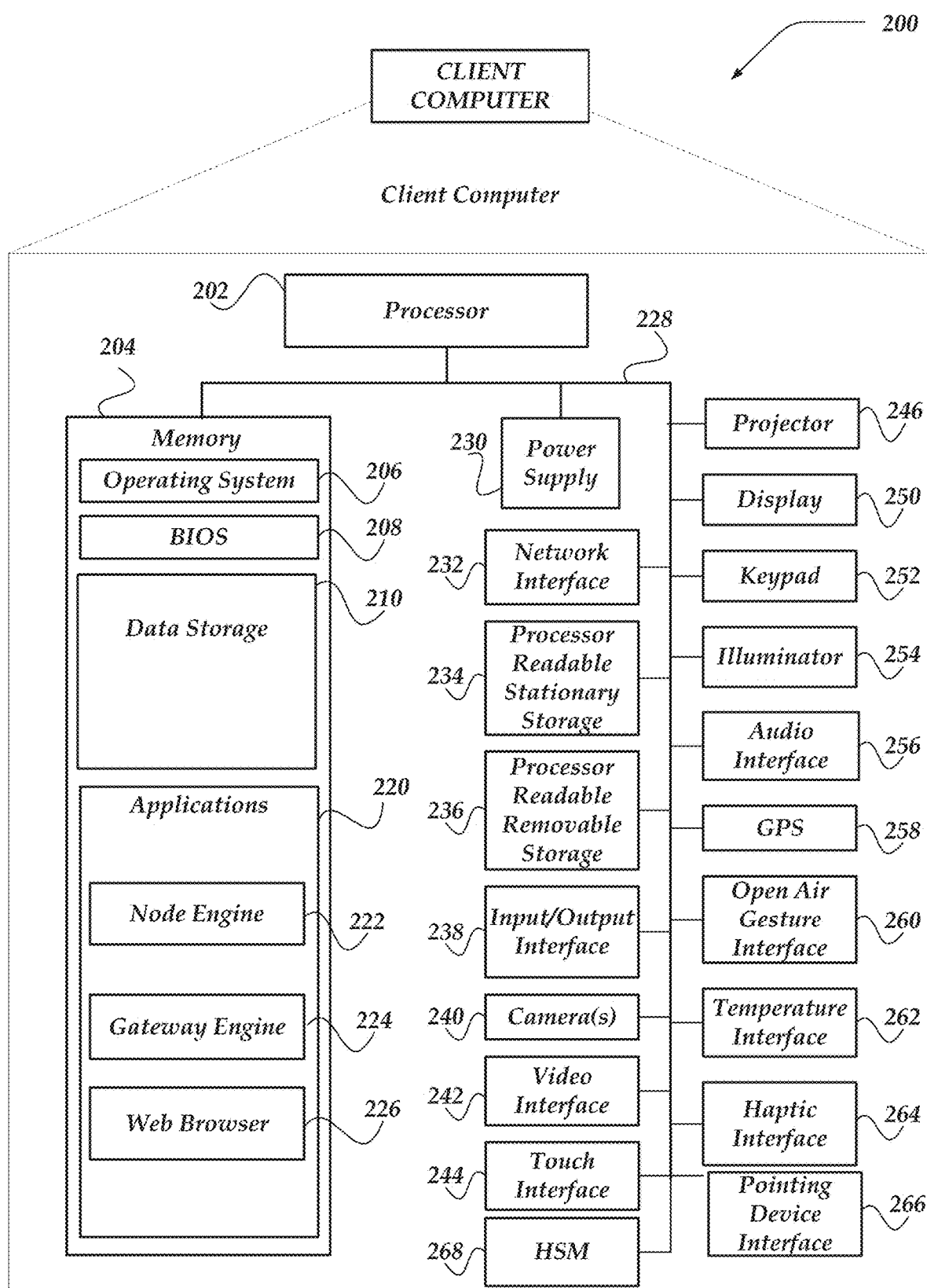
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers 102-105 shown in FIG. 1. Also, in some embodiments, one or more node computers, such as, node computers 120 may be client computers.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure overlay routes via management platform server computer 116, as discussed below in conjunction with FIG. 3. For example, a user may operate web browser application 226 in order to configure one or more port level policies or port isolation policies for one or more node computers or gateway computers.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, node engine 222, gateway engine 224, web browser 226. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
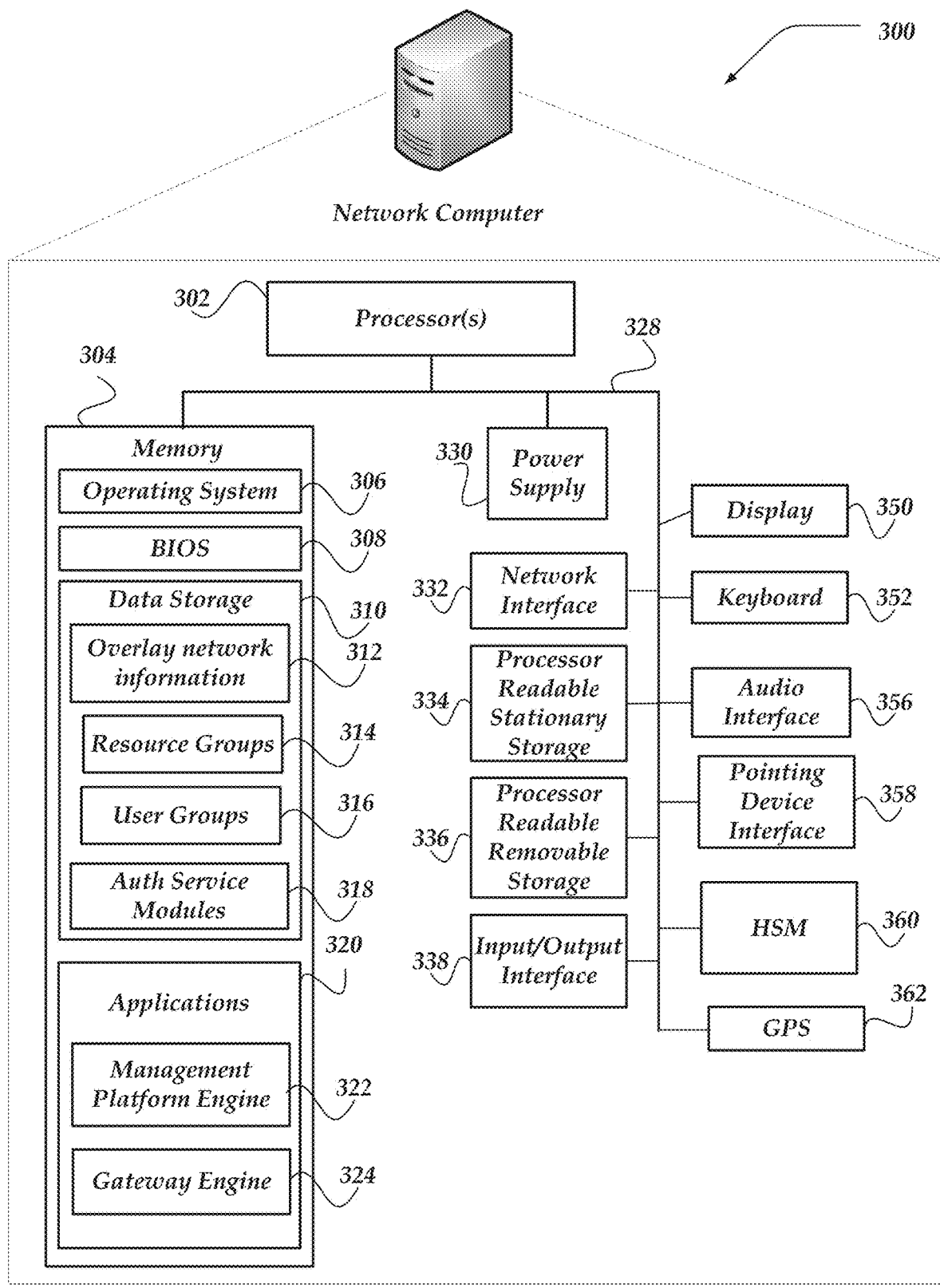
FIG. 3 illustrates a schematic embodiment of a network computer.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, or one or more node computers 120, authorization service server 122, of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, resource groups 314, user groups 316, authorization service modules 318, or the like. Overlay network information 312 may contain policy data defining which gateways or node computers are allowed to communicate with each other as well as the physical network routes that may be available. In one embodiment, overlay network information 312 may be generated and stored on management platform servers, such as, management platform server computer 116 before being distributed to gateway computers 118.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include management platform engine 322, or gateway engine 324 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, management platform engine 322, gateway engine 324, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110.

Furthermore, in at least one of the various embodiments, management platform engine 322, gateway engine 324, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to management platform engine 322, gateway engine 324, or the like, may be provisioned and de-commissioned automatically. Also, in at least one of the various embodiments, overlay network information 312, resource groups 314, user groups 316, authorization service modules 318, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Logical System Architecture

Figure 4:
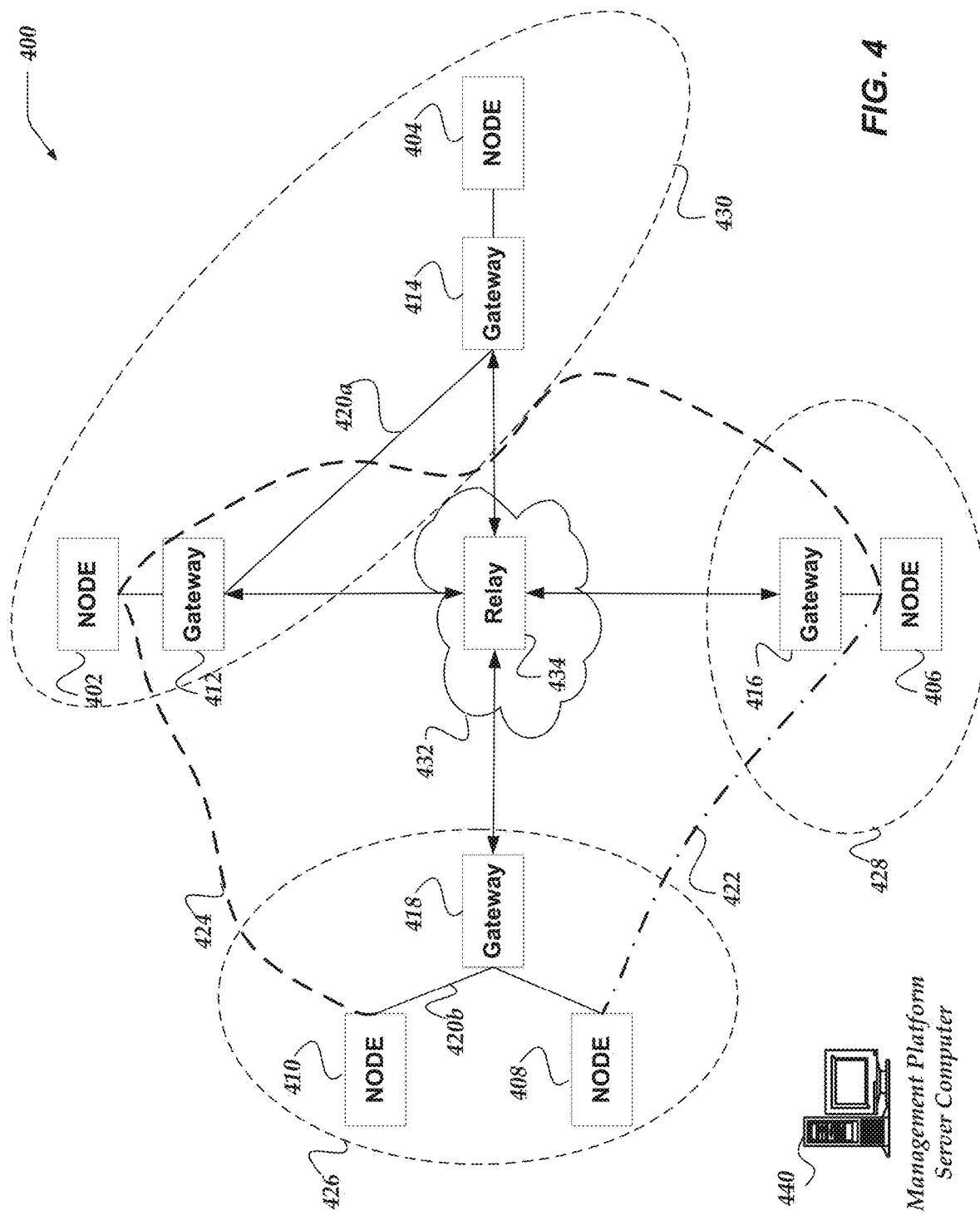
FIG. 4 illustrates a logical schematic of a network that includes overlay networks, node computers, gateway computers, relay computers, or the like, in accordance with at least one of the various embodiments.

FIG. 4 illustrates a logical schematic of network 400 that includes overlay networks, node computers, gateway computers, relay computers, or the like, in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers and gateway computers that comprise network 400. In one or more of the various embodiments, among other things, management platform server 440 may be arranged to manage the configuration or distribution of policy information.

In this example, physical networks, such as, physical network 420a, physical network 420b, a public network 432 provide an underlying physical network comprising network 400. In this example, node computer 404 is isolated from physical network 420a by gateway computer 414.

Also, in one or more of the various embodiments, private networks, such as, private network 426, private network 428, or private network 430 may represent separate or isolated networks that may be configured to prevent computers them from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay 434 and two or more of the gateway computers.

In at least one of the various embodiments, the gateway computers may be configured with one or more rule-based policies that determine access or restrictions for network communication on the networks. The particular rules or restrictions associated with how communication information (e.g., network packets) should be routed through the overlay network may be established by a management platform computer, such as management platform server computer 440, or the like. Configuration information may be pushed (e.g., router tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the overlay network through gateway computer 418. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420a or private network 420b) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include multiple gateway links each providing access to one or more networks. In one or more of the various embodiments, gateway links may be arranged to provide secure or redundant access to one or more networks. In some embodiments, one or more gateway links may have access to one or more networks not available or accessible to some or all of the other gateway links.

In at least one of the various embodiments, overlay networks may be enforced by using one or more overlay whitelists that define the endpoints (e.g., node computer, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising an overlay network.

In some embodiments, computers in different networks may be unable to identify or access each other because their local networks are using separate (perhaps conflicting) network address namespaces. For example, gateway computer 418, and consequently, node computers 408 and 410, cannot be accessed from outside of the private network 420b without gateway computer 418 first initiating a connection outside of private network 420b. This may be true even if a public network address associated with private network 420b is known because the network address of node computers in private networks, such as, private network 420b are not generally available to computers outside of the same private networks.

In some embodiments, relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can see the other, because they are both located in separate private networks, one or more relay computers, such as, relay computer 434 may be employed to bridge the networks to enable node computers in one network to reach node computers in another network.

In one or more of the various embodiments, while in some cases, gateway computers may be stationary on a network, in that they maintain the same network address indefinitely, the network address for a gateway computer may change from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network address. In one or more of the various embodiments, gateway computers may also experience a change in network address if the network changes, e.g. if a new internet service provider (ISP) is introduced. However, it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Accordingly, in one or more of the various embodiments, an existing connection between gateway computer 416 and gateway computer 412 through relay 434 may continue once relay 434 receives an updated policy from management platform server 440.

It is also possible for a device, such as one of node computers 402, 404, 406, 408, or 410, to be moved to a different gateway computer. In this scenario, management platform server 440 has to be notified of the new configuration before the node is to work again properly. For example, if node 410 were moved from private network 420b to private network 420a, management platform server 440 could be informed, either manually or automatically, and then update relevant relays with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

Further, in some embodiments, gateway computers or node computers may be combined into a single computer. Accordingly, in some embodiments, a client computer or network computer may be arranged to host both a gateway engine or a node engine. In some embodiments, this arrangement may enable a single device, such as, mobile computer, laptop, tablet computer, desktop computer, point-of-sale computer, diagnostic computer, or the like, to employ an onboard gateway engine and onboard node engine to access private networks or overlay networks. Thus, in some embodiments, the onboard gateway engine may be arranged to perform the role of a gateway computer or the on-board node engine may be arranged to perform the role of node computer. In some embodiments, a device may simply include an onboard gateway engine such that the other applications or operating system perform as a node computer.

Figure 5:
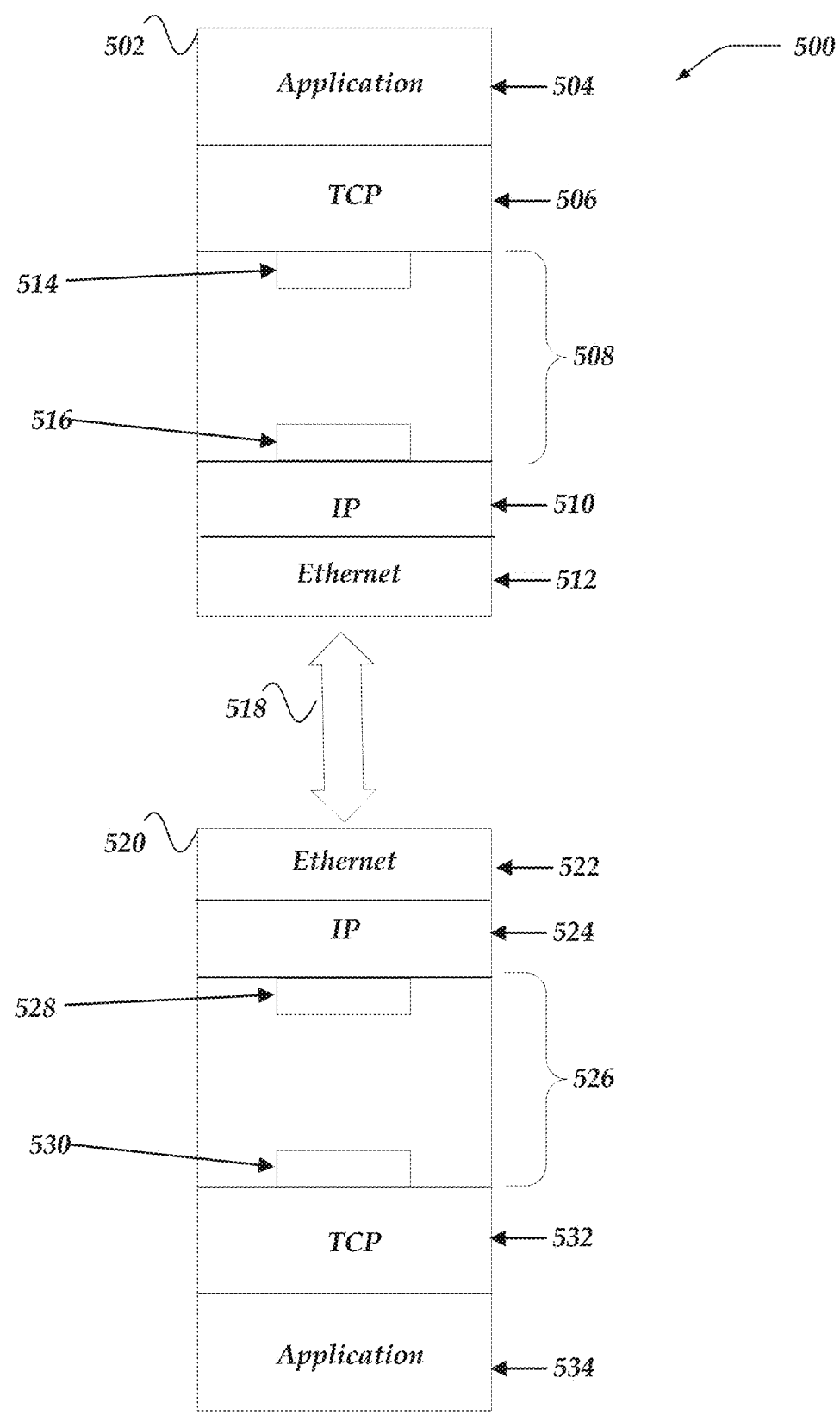
FIG. 5 illustrates a logical representation of a system for communicating in a network in accordance with at least one of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) or layer 512 (Ethernet later in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value of an underlay network.

In at least one of the various embodiments, at the gateway layer, layer 508 in FIG. 5, the GID of the source gateway or the target gateway are mapped to an actual network address. In at least one of the various embodiments, component 514 may represent components that are arranged to map GIDs to network addresses, and component 516 may represent components that are arranged to map from a network address to a GID.

In at least one of the various embodiments, since the GIDs may be mapped to an actual network addresses, network layers, such as IP layer 510 or Ethernet layer 512 may generate the appropriate network protocol information for the communication. Accordingly, in at least one of the various embodiments, network path 518 may be employed to communicate the communication network packets to its next destination.

In at least one of the various embodiments, communication 520 represents the received version of communication 502. The network protocol layers (Ethernet layer 522 or IP layer 522) may accept the communication over the network; gateway layer 526 employs component 528 and component 530 to map network addresses to GIDs; TCP layer 532 performs higher level network protocol actions using the GID in place of the network address; and application layer 534 employs the payload of the communication to perform application specific actions based on the actual contents of the payload.

In one or more of the various embodiments, network layers, such as, IP layer 510, Ethernet layer 512, Ethernet layer 522, or IP layer 524 may be associated with one or more network ports or one or more network links, hereinafter referred to as network ports or ports. In some embodiments, if there may be more than one port, gateway computers may be arranged to bridge one or more of the ports such that the bridged ports may be associated with the same network address information. Accordingly, in some embodiments, individual bridged ports may be associated with the same overlay policy because devices interacting with the bridged port may treat them as if they are same physical port even though there are more than physical connection (or more than one radio transceiver). Similarly, in some embodiments, if gateway computers have two or more ports that may be grouped into two or more port groups that may include one or more ports each.

Alternatively, in one or more of the various embodiments, one or more ports of a gateway computer with multiple ports may be individually assigned overlay policy or otherwise considered independently from each other. Accordingly, in some embodiments, gateway engines may be arranged to distinguish individual ports or port groups on gateway computers from each other as described in more detail below.

Figure 6:
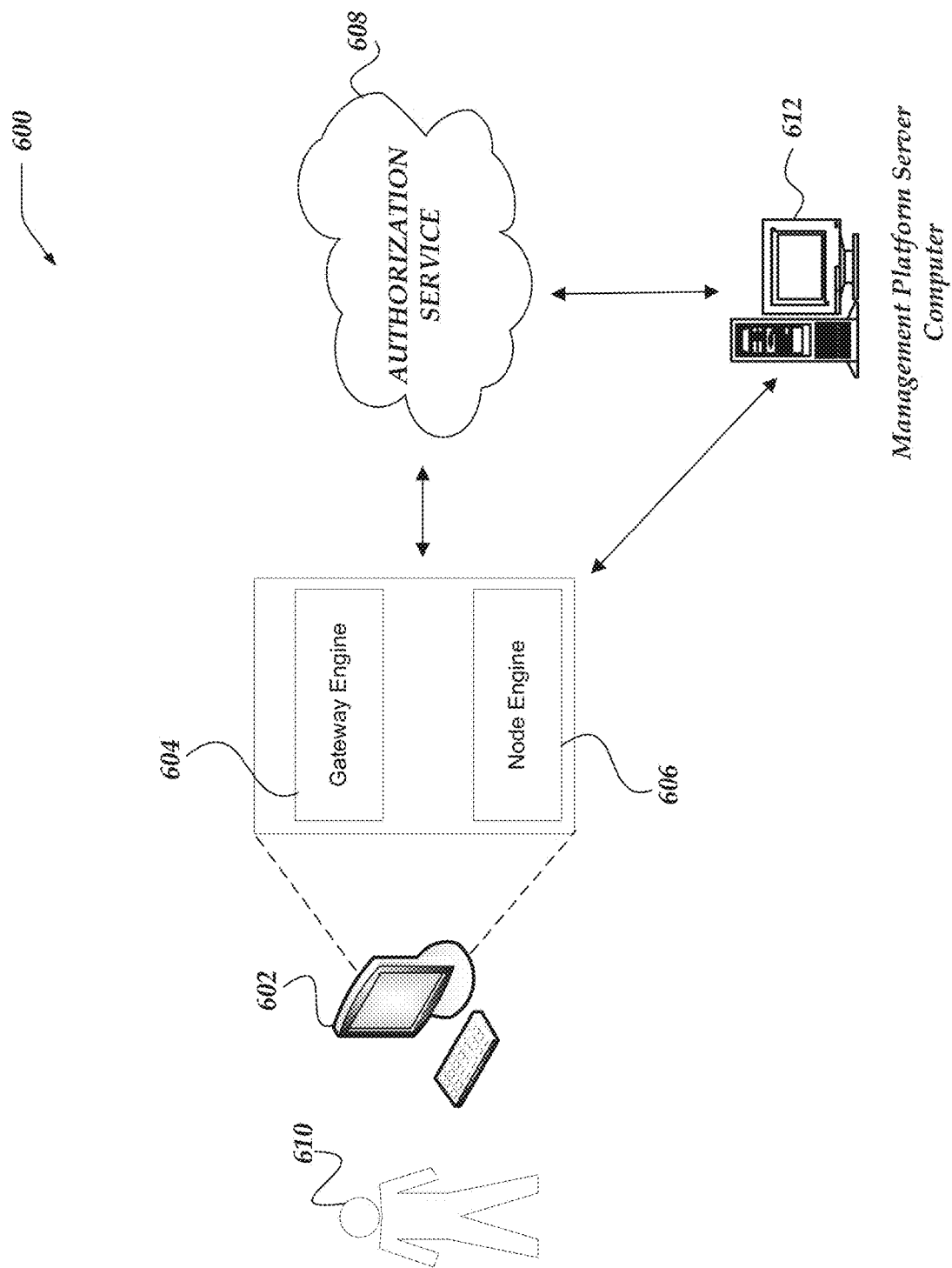
FIG. 6 illustrates a logical schematic of a system for applying overlay network policy based on users in accordance with one or more of the various embodiments.

FIG. 6 illustrates a logical schematic of system 600 for applying overlay network policy based on users in accordance with one or more of the various embodiments. In one or more of the various embodiments, systems, such as, system 600 may include a client computer, such as, client computer 602. In one or more of the various embodiments, client computers, such as, client computer 602 may be arranged to include gateway engine 604, node engine 606, or the like. Further, in some embodiments, system 600 may include one or more authorization services, such as, authorization service 608, or the like. Also, in some embodiments, system 600 may enable one or more users, such as, user 610 to interact with client computer 602 via one or more user input systems. Further, in some embodiments, management platform server computer 612 may be provided to host one or more management platform engines that may manage the overlay network.

In one or more of the various embodiments, client computer 602 may be arranged to include gateway engine 604 which acts as a gateway computer that enables client computer 602 to interface with overlay networks. In some embodiments, gateway engines may be installed on client computers, network computers, or the like, to provide similar services or functionality as a gateway computer. Further, in some embodiments, client computers, such as, client computer 602, may be arranged to include one or more node engines that may be considered to perform similarly as node computers. In some embodiments, node engines may be customized applications designed for accessing overlay networks. Likewise, in some embodiments, general applications, operating systems, or the like, may be implicit node engines that relay on the gateway engine to provide access to the overlay network. For example, in some embodiments, if gateway engine 604 may be configured to provide the network access services for client computer 602, one or more of its hosted applications or operating system may be considered node engines (logical node computers).

In one or more of the various embodiments, if a user, such as, user 610 logs into a node engine (e.g., the operating system of client computer 602, or other applications, such as, a point-of-sale program, or the like), such as, node engine 602, it may attempt to communicate with an authorization service, such as, authorization service 608 to authenticate user 610 and determine overlay network policies that may be applied to node engine 606 or gateway engine 604.

Accordingly, in one or more of the various embodiments, if user 610 provides user credentials to node engine 606, node engine 606 may be arranged to provide the provided user credentials to authorization service 608 for authentication. In some embodiments, if user 610 may be authenticated, authorization service 608 may send one or more responses to client computer 602/node engine 606 that indicate that user 610 is known and authenticated by authorization service 608. In addition, in some embodiments, authorization services may be arranged to provide various user identification information or authorization information in response to successful authentication requests. In some embodiments, the particular information included in authentication response messages may vary depending on the particular type or authorization service, as well as, how it may be configured. For example, in some embodiments, such information may include, authorization group memberships, user roles, email addresses, alternative usernames, username aliases, access tickets, access tokens, expiration information, or the like.

In some embodiments, authorization information for authenticated users may be accessed via operating system APIs, enabling other applications to access the information if necessary. Also, in some embodiments, other applications, including, node engines or gateway engines may be configured to re-authenticate users if they are accessed by users authenticated by other applications. In some cases, the users may be asked to provide credentials again. In other embodiments, the login credentials previously supplied by the user may be employed for subsequent authentication or authorization requests.

Accordingly, in some embodiments, if a user logs into client computer 602, node engine 606, gateway engine 604, or the like, to access resources in the overlay network, the node engine or gateway engine may be arranged to provide the user credentials or authorization information to a management platform engine. In some embodiments, management platform engines may be arranged to request that node engines or gateway engines provide user credentials that enable the management platform engine authentication the user. Thus, in some embodiments, management platform engine may be authorization information for users by node engines or gateway engine that previously employed an authorization service to authenticate the user. Also, in some embodiments, the management platform engine may generate its own authentication requests. Accordingly, in some embodiments, management platform server computer 612 may be arranged to provide an authentication request for user 610 to authorization service 608.

In some embodiments, if the management platform engine may be provided authorization information for an authenticated user, it may perform various actions then enable the node engines corresponding to the user to access resources in the overlay network.

In some embodiments, authorization information for a user provided by authorization services may include information that indicates which authorization groups that may include the user. Accordingly, in some embodiments, management platform engine may be arranged to map authorization groups to user groups defined for the overlay network. In some embodiments, different authorization services may employ different fields, data formats, data types, or the like, to represent authorization groups. Accordingly, in some embodiments, management platform engine may be arranged to employ one or more authorization service modules that provide the instructions for processing authorization information from different authorization services. Note, in some embodiments, authorization service modules may also be arranged to encapsulate the instructions, message formats, return/result codes, or the like, that may be employed to communicate with different authorization services or otherwise submit authentication requests or interpret authorization information.

In one or more of the various embodiments, management platform engine may be arranged to define one or more user groups that may be configured to map to one or more authorization groups. In some embodiments, user groups may be data structures that include authorization group identifier attribute that may store one or more authorization groups identifiers (e.g., authorization group names). Accordingly, in one or more of the various embodiments, users may be automatically associated with user groups that have authorization group identifiers that match the authorization groups that provided for them from the authorization service.

Also, in one or more of the various embodiments, management platform engine may be arranged to define one or more resource groups that include one or more nodes (node engines, node computers, or the like). In one or more of the various embodiments, management platform engine may be arranged to enable overlay network policies to be associated with resource groups. Thus, in some embodiments, if a node computer may be included in a resource group, that node computer automatically is associated with the overlay network policies that may be associated the resource group.

In some embodiments, user groups may be associated with access tags and resource groups may be associated with resource tags. In some embodiments, access tags and resource tags may be employed to associate user groups with resource groups. In some embodiments, management platform engine may be arranged to automatically associated user groups with resource groups based on comparing the access tags associated with a user group to the resource tags associated with resource groups.

Thus, in this example, user 610 may login into gateway engine 604 on client computer 602. Next, in this example, gateway engine 604 may employ authorization service 608 to authenticate user 610. Alternatively, in some embodiments, management platform engine 612 may be arranged to provide a user interface, client service, or the like, on client computer 602 that user 610 may employ for logging in to the overlay network. Accordingly, in this example, a management platform engine running on management platform server computer 612 may be arranged to send the authentication request for user 610 to authorization service 608. Thus, in this example, if user 610 may be authenticated, authorization service 608 may provide authorization information to management platform server computer 612. Alternatively, in some embodiments, a client management platform engine (not shown) running on client computer 602 may receive the authorization information to provide to the management platform server computer.

In this example, management platform engine hosted on management platform server computer 612 may compare the authorization group information for user 610 to the authorization group identifiers associated with user groups for the overlay network. In some embodiments, if there are matches, user 610 may be added to the matching user groups.

In one or more of the various embodiments, the management platform engine may be arranged to compare the access tags associated with the user groups that include user 610 to the resource tags of the resource groups that have been configured for the overlay network. In some embodiments, the management platform engine may be arranged to generate overlay configuration that conforms to the overlay network policies that correspond to the resource groups that match up with the user groups that include user 610. Accordingly, in some embodiments, the management platform engine may generate overlay network configuration information that may be tailored to user 610.

In one or more of the various embodiments, the management platform engine hosted on management platform server computer 612 may be arranged to provide the overlay network configuration information to gateway engine 604 to enable gateway engine 604 to enforce the overlay network policies determine for node engine(s) 606 and user 610.

In one or more of the various embodiments, if a different user logs onto client computer 602 or node engine 606, the overlay network configuration information that was generated for user 610 may be discarded and the management platform engine may be arranged to provide updated overlay network configuration information to gateway engine 604 based on the user groups that include the new user.

Also, in one or more of the various embodiments, one or more user groups may be associated with an access window that may define time/date periods that may be used to determine if a particular user group may be qualified for applying particular overlay network policy for that user at the current time. Likewise, in some embodiments, if the current time is outside of the access window for a user group, that user group may be disqualified until the access window occurs again.

Likewise, in one or more of the various embodiments, one or more user groups may be associated with negative access windows that define time periods when the user groups may be disqualified from the overlay network policies rather than being qualified.

In one or more of the various embodiments, if one or more user groups may become disqualified or qualified based on their access windows, management platform engines may be arranged to generate updated overlay network configuration information. In some embodiments, if user groups become disqualified, the overlay network configuration information may be updated to remove privileges from the user that may be associated with the disqualified user groups. Similarly, in some embodiments, if disqualified user groups become qualified, the overlay network configuration information may be updated to restore one or more privileges to the user that may be associated with the qualified user groups.

In one or more of the various embodiments, innovations described herein provide a mechanism for managing user privileges that is separate or independent from user management used by the underlay network. Accordingly, in some embodiments, permissions for users in the overlay network may be completely different than how they may be configured in for the underlay network. This may be considered similar to how identity based management of node computers in the overlay network divorces overlay network management from limitations associated with network address based identity of device. Here, in some embodiments, using user groups, resource groups, access tags, resource tags, or the like, to allocate policy based on users enables user management for overlay network to operate separately from user management on the underlay network. Thus, in some embodiments, each overlay network may have a separate user management/user privilege policy than the underlay network. For example, a user in the Administration Group or Super User Group in the underlay network may be granted less privileges on the overlay network. Thus, in this example, an organization's IT technicians may be granted elevated permissions on the underlay network to enable them to perform administration of the physical network. However, in some embodiments, their access to resources in the overlay network may be restricted without impacting their ability to manage the physical network.

In some embodiments, if a user may not have access to a gateway computer or gateway engine, the user may be enabled to log into the management platform and be provisionally authenticated by the authentication service. Accordingly, in some embodiments, the user may be provided access to user groups associated with a management service because of their membership in authorization groups determined by the authorization service, In some embodiments, one or more of the authorization groups may be configured to enable automatic overlay network user onboarding. In some embodiments, the management platform engine may be arranged to provide the user with a url, link, or other facility that enables the user to access a downloadable gateway engine and a unique token. In some embodiments, the token may be provided using a facility that is separate from the facility used to download the gateway engine. For example, for some embodiments, a link used to obtain the token may also encode information that is associated with the management platform engine of the overlay network. Thus, in some embodiments, if the user downloads and installs the gateway engine on their local computer, the user may employ the token delivery facility (e.g., a custom generated URL) to obtain the token. In some embodiments, employing the token delivery facility may trigger the downloaded gateway engine to configure itself to use the associated management platform engine and provision itself on the overlay network. In some embodiments, the downloaded gateway engine may be configured initially based on preset/preloaded information associated with a default provisioning user group. For example, for some embodiments, this may include an overlay network IP address, gateway identifier for the overlay network, configuration related to relay computers, user access restrictions (e.g., restricting the downloaded gateway engine to only be authenticated by the user that downloaded the gateway engine), tags, network settings, or the like. In some embodiments, if these initial provisioning actions succeed, the user may be prompted to authenticate with the overlay network and receive additional user specific overlay network policy at the computer where the downloaded gateway engine is installed.

Figure 7:
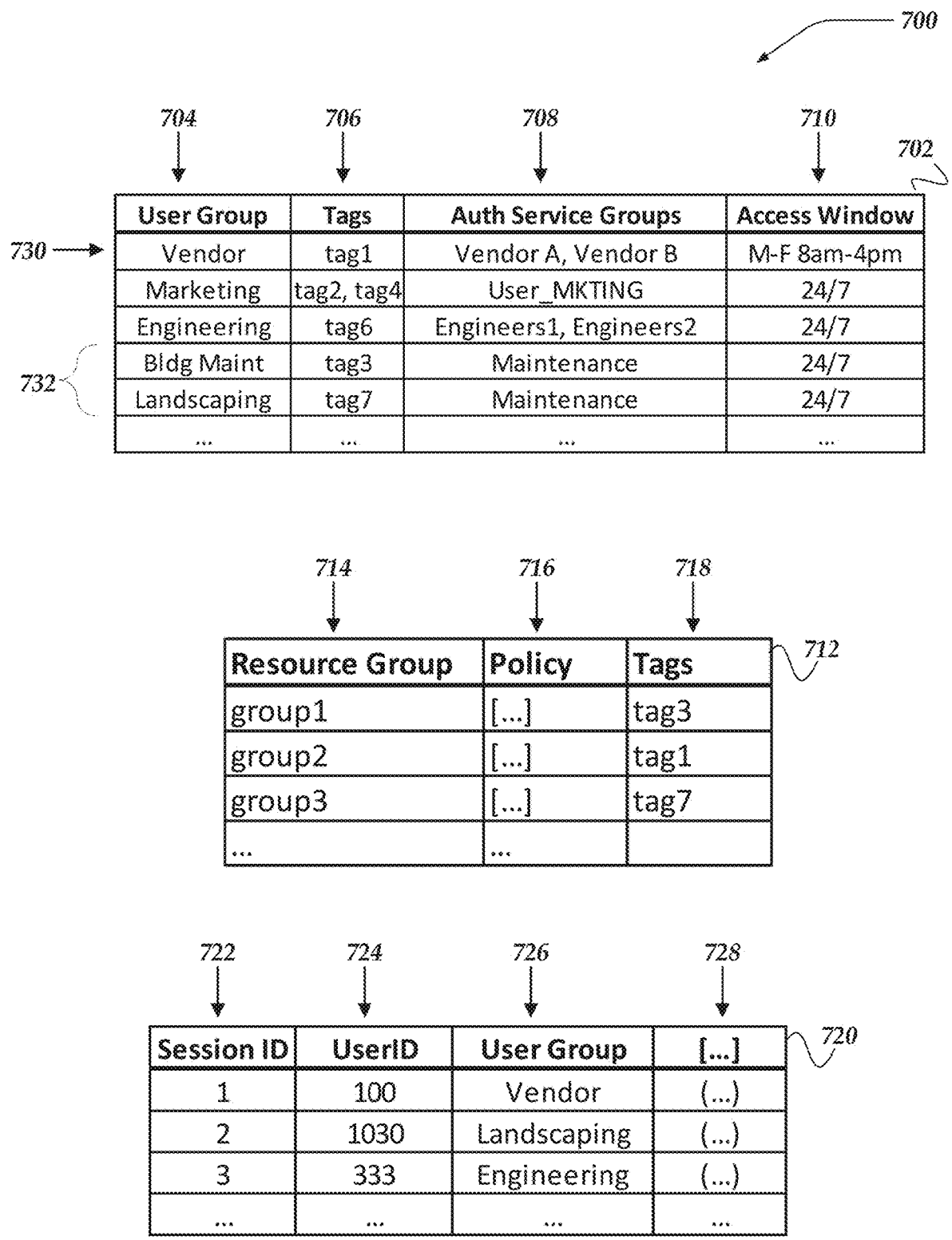
FIG. 7 illustrates a logical schematic of a portion of a system showing a portion of the data structures for applying overlay network policy based on users in accordance with one or more of the various embodiments.

FIG. 7 illustrates a logical schematic of a portion of system 700 showing a portion of the data structures for applying overlay network policy based on users in accordance with one or more of the various embodiments. In one or more of the various embodiments, management platform engine may be arranged to employ various data structures for defining user groups, resource groups, or the like.

In this example, table 702 represents a data structure for user groups. In some embodiments, user groups may include fields or attributes, such as, field 704 (user group name), field 706 (access tags), field 708 (authorization service groups), field 710 (access window), or the like.

Also, in this example, table 712 represent a data structure for resource groups. In some embodiments, resource groups may include fields or attributes, such as, field 714 (resource group name), field 716 (policy information associated with the user group), field 718 (resource tags), or the like.

Further, in some embodiments, management platform engines or gateway engines may be arranged to track user session information. Accordingly, in this example, table 720 represent a data structure for user session information. In some embodiments, user session information may include one or more fields or one or more attributes, such as, field 722 (session ID), field 724 (user ID), field 726 (user group), field 728 (other information), or the like.

In this example, users that are a member of authorization group Vendor A in the underlay network may be assigned to user group Vendor in the overlay network. See, record 730. Also, in this example, users that are a member of authorization group Vendor B in the underlay network may also be assigned user group Vendor in the overlay network. See, record 730. Accordingly, in one or more of the various embodiments, management platform engines may be arranged to characterize users separately or differently than the underlay network. In this example, the overlay network is configured to treat all vendors the same rather than providing them different privileges.

Likewise, in some embodiments, users in one authorization group in the underlay network may be assigned to two or more user groups in the overlay network. In this example, users that are part of the authorization group Maintenance group in the underlay network are assigned to two user groups, Bldg Maint and Landscaping in the overlay network. See, record 732.

In some embodiments, if a user may be part of multiple user groups such as the maintenance auth service group. In some embodiments, if both "Bldg maint" and "Landscape" had different access windows, a user may log in at a time when they had access to "Landscape" but not "Bldg maint". In such a case, for some embodiments, the auth tags, policies, or the like, for Landscape would be applied but the tags, policies, or the like, for Bldg maint would not be applied.

Further, in some embodiments, access windows may be set up with a various schedule configuration, including weekly, monthly (including particular days of the month, such as, 1st and 5th days of the month), monthly by day (e.g., every second Wednesday), for specific date ranges, or the like. In some embodiments, access windows may be scheduled to accommodate a holidays.

Also, in one or more of the various embodiments, if an access window ends, the user's access to the associated resources will end. In some embodiments, this may apply in multiple-user group scenarios such as those described above. For example, a maintenance employee in both groups may be enabled to access to both resources, but the access windows for the two group may end at different times. For example, if the access window for Landscaping ends, the user will lose access to those resources associated with Landscaping and if Bldg maint's access window ends, the user will lose access to the resources associated with Bldg maint as well.

Accordingly, in some embodiments, user privileges in the overlay network may be managed independently of the underlay networks. For example, if there is an indication that users in the underlay network have been comprised, the administrators may lock them out of the overlay network without intervention by the IT staff responsible for the managing the underlay network.

Generalized Operations

FIGS. 8-13 represent the generalized operation of applying overlay network policy based on users in accordance with at least one of the various embodiments. In at least one of the various embodiments, processes 800, 900, 1000, 1100, 1200, and 1300 described in conjunction with FIGS. 8-13 may be implemented by or executed on one or more processors of a relay computer, a gateway computer, or a management platform server, such as network computer 300 of FIG. 3. In other embodiments, these processes, or portions thereof, may be implemented by or executed on one or more processors of a plurality of network computers or client computers, such as network computer 300 of FIG. 3 or client computer 200 of FIG. 2. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 8-13 may be used for applying overlay network policy based on users in accordance with at least one of the various embodiments or architectures such as those described in conjunction with FIGS. 4-7. Further, in at least one of the various embodiments, some or all of the action performed by processes 800, 900, 1000, 1100, 1200, and 1300 may be executed in part by node engine 222, gateway computer 224, management platform engine 322, gateway engine 324, or the like, or combination thereof.

Figure 8:
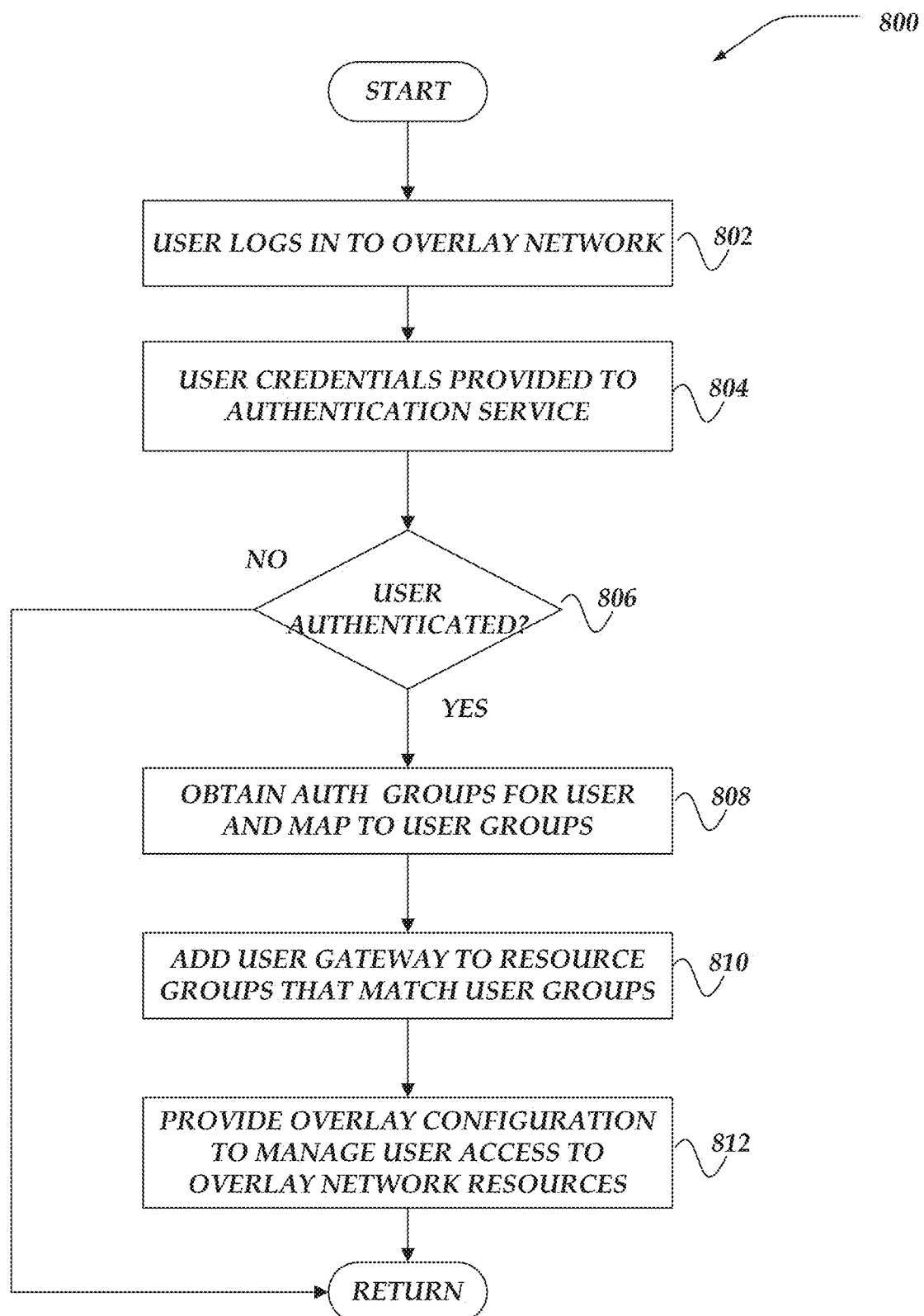
FIG. 8 illustrates an overview flowchart of a process for applying overlay network policy based on users in accordance with one or more of the various embodiments.

FIG. 8 illustrates an overview flowchart of process 800 for applying overlay network policy based on users in accordance with one or more of the various embodiments. After a start block, at block 802, in one or more of the various embodiments, a user may log in to an overlay network. In one or more of the various embodiments, overlay networks may be arranged to provide one or more facilities that enable a user to login or otherwise provide their login credentials to the management platform engine, node engines, node computers, gateway engines, gateway computers, or the like. In some embodiments, applications used on a client computer used by a user may forward credential information to authorization services or management platform engines.

At block 804, in one or more of the various embodiments, the users log in credentials may be provided to an authorization service.

At decision block 806, in one or more of the various embodiments, if the user may be authenticated, control may flow to block 808; otherwise, control be returned to a calling process. In one or more of the various embodiments, if the authorization service fails to authenticate the user, the overlay network policies associated with the gateway associated with the user may remain unchanged as if the user did not login. In some embodiments, management platform engines may be arranged to update the overlay network policies associated with gateway to reduce access to the overlay network.

In one or more of the various embodiments, if the same user is denied authentication a number of times that exceed a defined threshold value, management platform engines may be arranged to generate overlay network policies that lockdown or otherwise disable the node computers, node engines, gateway engines, gateway computers, or the like, associated with the user that repeatedly fails authentication.

At block 808, in one or more of the various embodiments, management platform engines may be arranged to obtain one or more authorization groups that may be associated with the user. In one or more of the various embodiments, the authorization groups may be mapped to one or more user groups in the overlay network.

At block 810, in one or more of the various embodiments, management platform engines may be arranged to add the gateway associated with the user to one or more resource groups based on matches with the one or more user groups.

At block 812, in one or more of the various embodiments, management platform engine may be arranged to generate or provide overlay network configuration information that enables the user to access one or more resources in the overlay network.

In one or more of the various embodiments, management platform engines may be arranged to generate overlay network policies for the gateway associated with the user based on the resource groups that include the gateway.

In one or more of the various embodiments, management platform engines may be arranged to provide the overlay network policy information to the gateway associated with the user using a control channel on the underlay network.

Next, in one or more of the various embodiments, control may be returned to a calling process.

Figure 9:
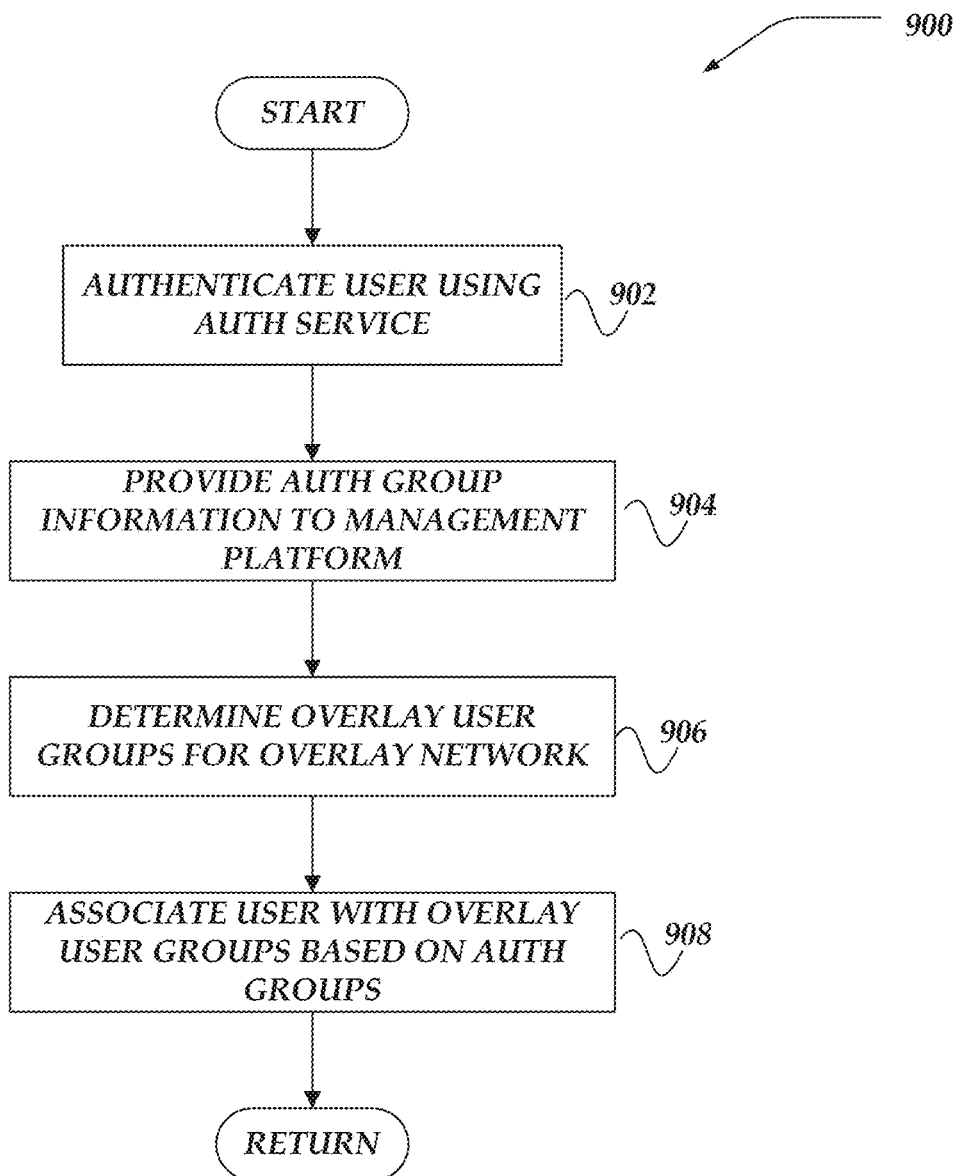
FIG. 9 illustrates a flowchart for a process for applying overlay network policy based on users in accordance with one or more of the various embodiments.

FIG. 9 illustrates a flowchart for process 900 for applying overlay network policy based on users in accordance with one or more of the various embodiments. After a start block, at block 902, in one or more of the various embodiments, a management platform engine may be arranged to authenticate a user using an authorization service. In some embodiments, management platform engines may be arranged to provide user login credentials to one or more authorization services to authenticate the user.

In one or more of the various embodiments, user login credentials may be collected by a client management platform engine running on a client computer the user may be accessing. In some embodiments, management platform engines may be arranged to provide a remotely accessible user interface, such as, a website, or the like, that a user may employ to login. In some embodiments, node computers or node engines used by the user may be arranged to provide the user login credentials to the management platform engine.

Alternatively, in some embodiments, one or more other services or applications trusted to vouch for the user may authenticate the user for the management platform engine.

For example, if the authorization service may employ a security protocol based on Kerberos, the management platform engine may be provided tickets or tokens from a client management platform engine, node engine, gateway engine, operating system, or the like, that may be used to authenticate the user without the management platform engine sending a request directly to the authorization service to authenticate the user.

At block 904, in one or more of the various embodiments, authorization group information for the user may be provided to the management platform engine.

In one or more of the various embodiments, as part of the authenticating the user, the authorization service may provide authorization group information to the management platform engine. In some embodiments, management platform engines may be arranged to request authorization group information from authorization services for the user.

At block 906, in one or more of the various embodiments, the management platform engine may be arranged to determine one or more user groups for the overlay network. In one or more of the various embodiments, user groups may be defined by the administrators of the overlay network. In some embodiments, one or more default user groups may be defined or installed for initial use.

Accordingly, in some embodiments, management platform engines may be arranged to obtain or load the available user groups from a data store or other source of configuration information.

At block 908, in one or more of the various embodiments, the management platform engine may be arranged to associate the user with one or more user groups based on the authorization groups associated with the user. In one or more of the various embodiments, management platform engines may be arranged to iterate through the user groups to determine the one or more user groups to include the user.

Next, in one or more of the various embodiments, control may be returned to a calling process.

Figure 10:
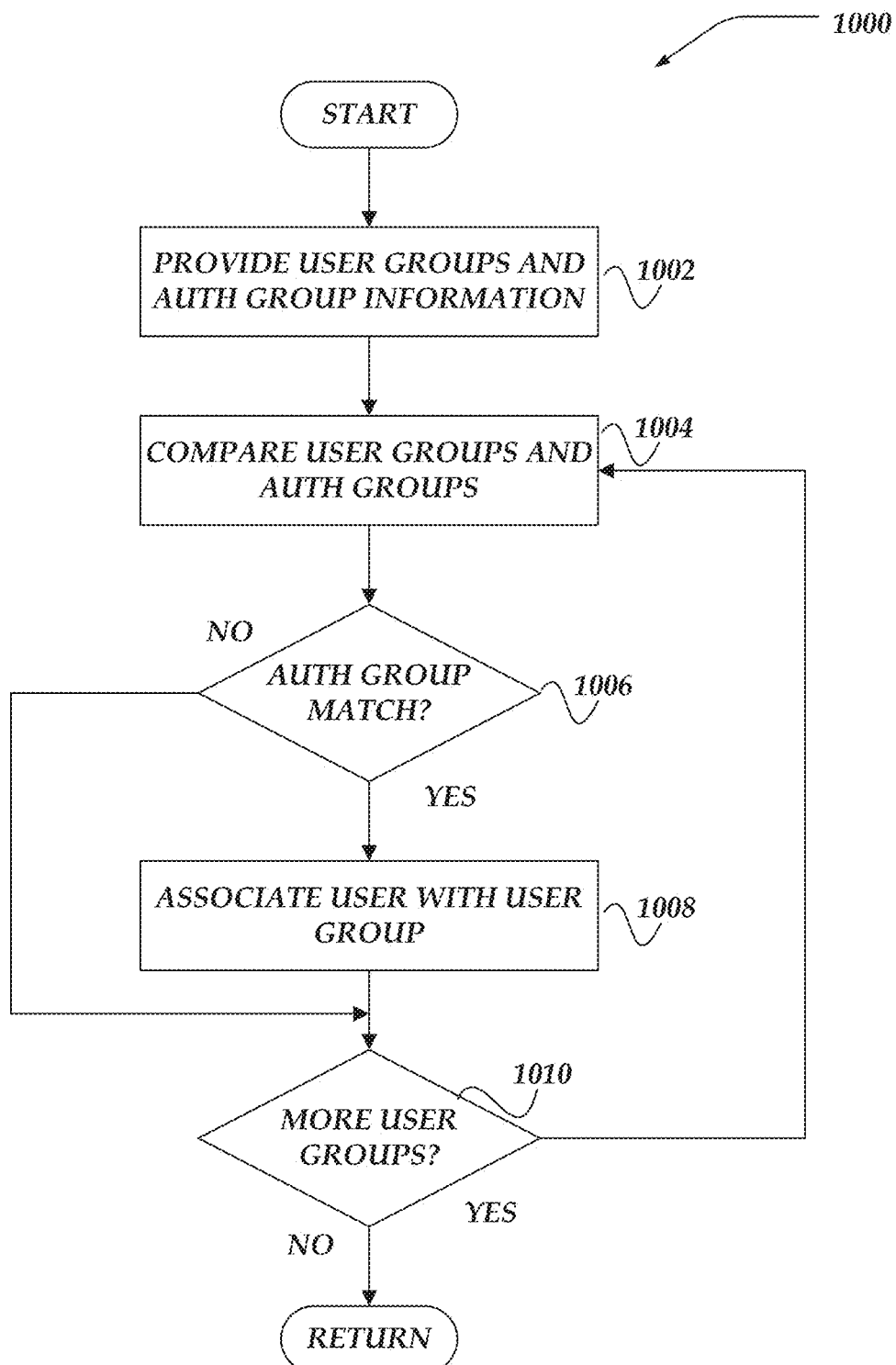
FIG. 10 illustrates a flowchart for a process for applying overlay network policy based on users in accordance with one or more of the various embodiments.

FIG. 10 illustrates a flowchart for process 1000 for applying overlay network policy based on users in accordance with one or more of the various embodiments. After a start block, at block 1002, in one or more of the various embodiments, a management platform engine may be provided one or more user groups and authorization group information. In one or more of the various embodiments, management platform engines may be configured by the administrators of the overlay network to have one or more user groups. In one or more of the various embodiments, authorization group information for the user may be provided by an authorization service. Accordingly, in some embodiments, the management platform engine may provide user login credentials to the authorization service to obtain the authorization group information for authenticated users.

Alternatively, in some embodiments, one or more other services or applications trusted to vouch for the user may provide the authorization group information to the management platform engine.

For example, if the authorization service may employ a security protocol based on Kerberos, the management platform engine may be provided tickets or tokens from a client management platform engine, node engine, gateway engine, operating system, or the like, that may be used to authenticate the user and obtain the authorization group information without the management platform engine sending a request directly to the authorization service to obtain the authorization group information.

In one or more of the various embodiments, authorization service group information may include a list or collection of authorization groups defined in the authorization service that include the user.

In one or more of the various embodiments, authorization groups may be considered independently managed via the authorization service rather the overlay network. In contrast, in some embodiments, the definition or management of user groups may be managed via the administrators of the overlay network.

At block 1004, in one or more of the various embodiments, the management platform engine may be arranged to compare the one or more user groups with one or more authorization groups. In one or more of the various embodiments, users may be associated with one or more authorization groups. Likewise, in some embodiments, one or more user groups may be associated with one or more authorization groups.

In one or more of the various embodiments, user groups may be arranged to include one or more fields that include identifiers that correspond to one or more authorization groups. In some embodiments, authorization group identifiers may be labels, names, or the like, that may match the labels or names used by the authorization service to identify the authorization groups.

In one or more of the various embodiments, management platform engines may be arranged to compare authorization group identified associated with user groups to the authorization group identifiers included in the authorization group information provided by authorization services using various strategies, such as, strict equivalence, fuzzy equivalence, or the like. In some embodiments, different user groups may be configured to employ different comparison strategies. In some embodiments, fuzzy comparisons may be defined using regular expressions, wildcards, or the like.

At decision block 1006, in one or more of the various embodiments, if a matching authorization group may be determined, control may flow to block 1008; otherwise, control may flow decision block 1010.

At block 1008, in one or more of the various embodiments, the management platform engine may be arranged to associate the user with the user group that matched the authorization group. In one or more of the various embodiments, management platform engines may be arranged to associate users with each user group that matches the authorization groups that include the user. Thus, in some embodiments, users may be considered to be included in user groups that may be matched to authorization groups.

At decision block 1010, in one or more of the various embodiments, if more user groups remain to be compared, control may loop back to block 1004; otherwise, control may be returned to a calling process. In one or more of the various embodiments, management platform engines may be arranged to enable administrators of overlay networks to define or configure one or more user groups. Accordingly, in some embodiments, each user group may be compared with the authorization groups to determine if there may be matches.

Next, in one or more of the various embodiments, control may be returned to a calling process.

Figure 11:
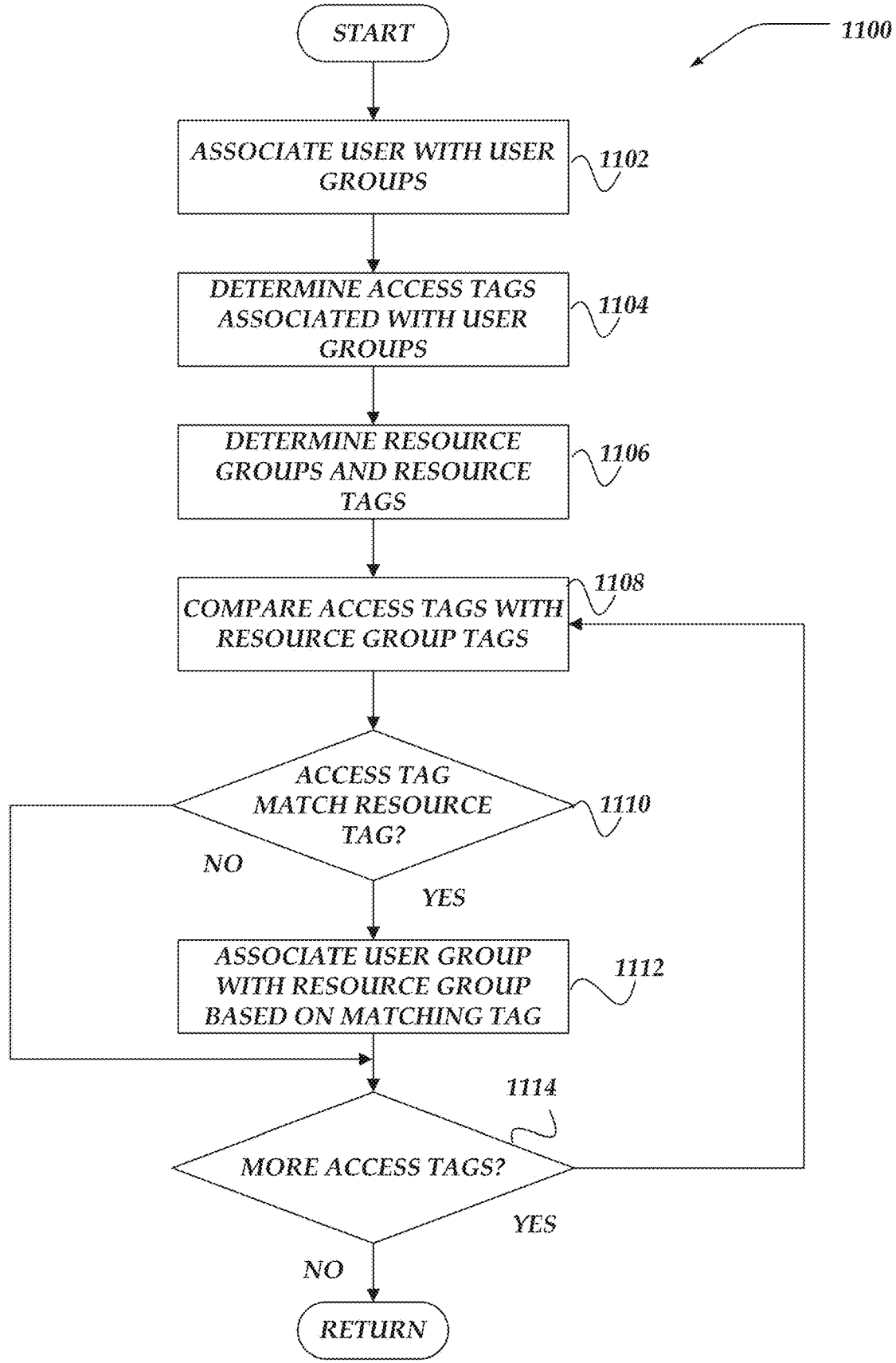
FIG. 11 illustrates a flowchart for a process for applying overlay network policy based on users in accordance with one or more of the various embodiments.

FIG. 11 illustrates a flowchart for process 1100 for applying overlay network policy based on users in accordance with one or more of the various embodiments. After a start block, at block 1102, in one or more of the various embodiments, a management platform engine may be arranged to associate the user with one or more user groups. As described above, in some embodiments, management platform engines may be arranged to associate users with one or more user groups based on the authorization groups they may be associated with.

At block 1104, in one or more of the various embodiments, the management platform may be arranged to determine one or more access tags that may be associated with the user groups. In one or more of the various embodiments, user groups may be associated with one or more access tags. In some embodiments, the same access tag may be associated with more than one user group. Accordingly, in one or more of the various embodiments, management platform engines may be arranged to merge the access tags from the one or more user groups that include the user to produce a list or collection of access tags.

In one or more of the various embodiments, management platform engines may be arranged to omit the merging of access tags even though it may cause the access tags to be considered more than once.

As described above, in some embodiments, access tags may be implemented using various data types or formats, such as, strings, numbers, GUIDs, or the like. In some embodiments, human readable strings may be commonly used.

At block 1106, in one or more of the various embodiments, the management platform engine may be arranged to determine one or more resource groups and the one or more resource tags associated with the one or more resource groups.

In one or more of the various embodiments, resource groups may be associated with one or more resource tags. In some embodiments, resource tags may be considered similar to access tags except for being associated with resource groups rather than being associated with user groups.

In one or more of the various embodiments, management platform engines may be arranged to provide one or more resource groups based on configuration information used to establish the overlay network. For example, for some embodiments, administrators of the overlay network may be enabled to define or associate various tags with resource groups to make the resource tags.

At block 1108, in one or more of the various embodiments, the management platform engine may be arranged to compare the one or more access tags with the one or more resource tags.

In one or more of the various embodiments, management platform engines may be arranged to iterate through the resource groups, comparing resource tags in each group with the access tags that may be determined based on the user groups that that may include the user.

In one or more of the various embodiments, management platform engines may be arranged to compare resource tags and access tags using various strategies, such as, strict equivalence, fuzzy equivalence, or the like. In some embodiments, different resource groups may be configured to employ different comparison strategies. In some embodiments, fuzzy comparisons may be defined using regular expressions, wildcards, or the like.

At decision block 1110, in one or more of the various embodiments, if an access tag matches a resource tag, control may flow to block 1112; otherwise, control may flow to decision block 1114.

At block 1112, in one or more of the various embodiments, the management platform may be arranged to associate a user group with a resource group based on the match of the access tag and the resource tag.

In one or more of the various embodiments, management platform engines may be arranged to forgo maintaining/persisting the user group/resource group associations such that they may be discarded as soon as the gateway associated the user may be added to the matching resource groups.

At decision block 1114, in one or more of the various embodiments, if there may be more tags to compare, control may loop back to block 11089; otherwise, control may be returned to a calling process. In one or more of the various embodiments, management platform engines may be arranged to compare each access tag with the resource tags in each resource group to ensure a gateway may be included in all of the resource groups as intended by the administrators of the overlay network.

Next, in one or more of the various embodiments, control may be returned to a calling process.

Figure 12:
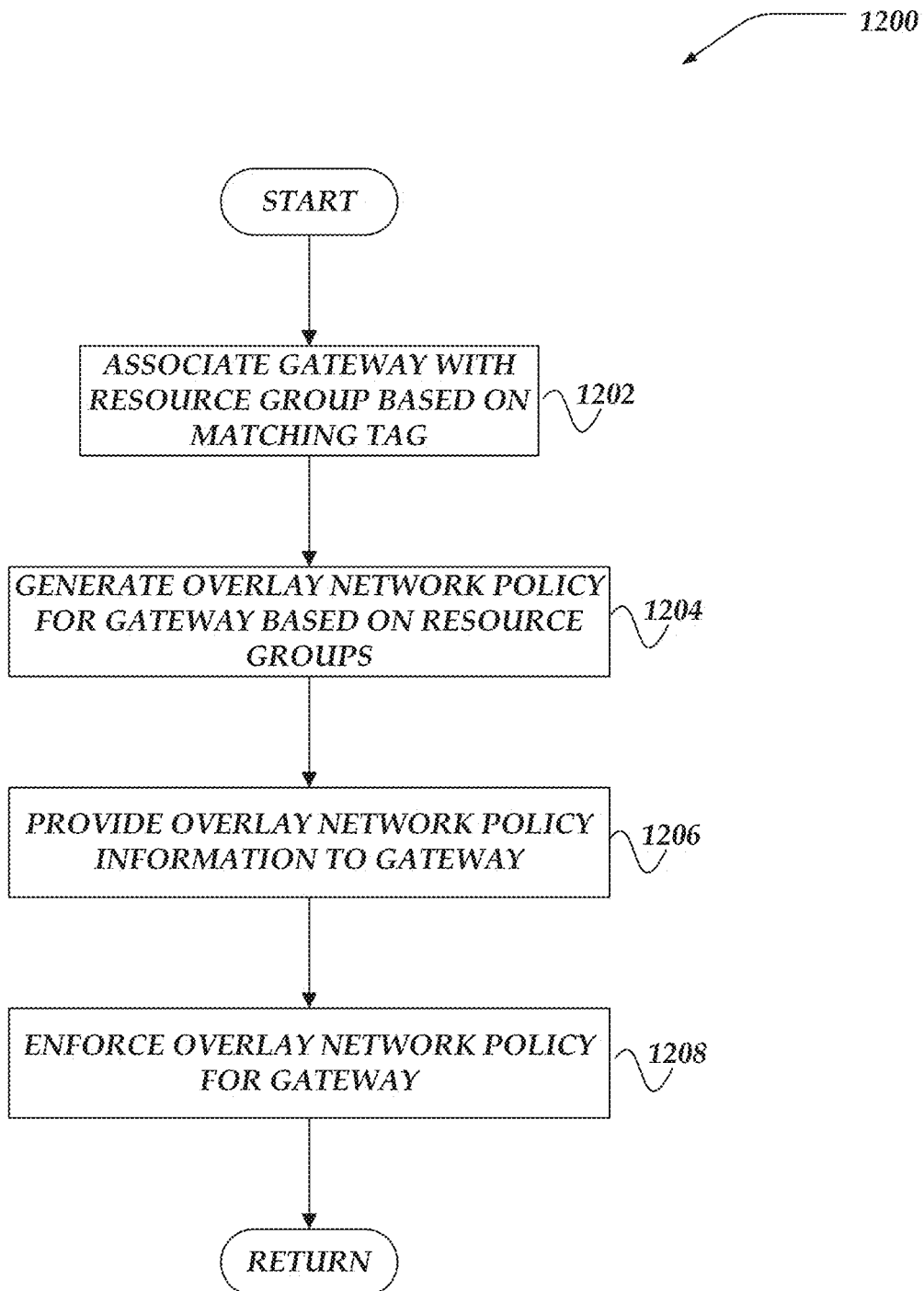
FIG. 12 illustrates a flowchart for a process for applying overlay network policy based on users in accordance with one or more of the various embodiments.

FIG. 12 illustrates a flowchart for process 1200 for applying overlay network policy based on users in accordance with one or more of the various embodiments. After a start block, at block 1202, in one or more of the various embodiments, a management platform engine may be arranged to associate a gateway associated with the user with one or more resource groups that may be associated with the user. In some embodiments, if access tags in user groups associated with the user match resource tags associated with a resource group, the gateway associated with the user may be automatically added to those resource groups.

At block 1204, in one or more of the various embodiments, the management platform engine may be arranged to generate overlay network policy information for the gateway based on the resource groups. As described above, in some embodiments, resource groups may be associated with various overlay network policies, thus adding the gateway associated with the user to one or more resource groups may determine the overlay network policies for the gateway being employed by the user.

At block 1206, in one or more of the various embodiments, the management platform may be arranged to provide the overlay network policy information to the gateway. As described above, management platform engines may be arranged to communicate overlay network policy information to the gateway computer or gateway engine over the underlay network using a control channel.

At block 1208, in one or more of the various embodiments, the gateway may be arranged to enforce the overlay network policy that may be provided by the management platform engine. In some embodiments, in response to being provided updated overlay network policy information, gateway computers or gateway engines may begin enforcing the provided policies. In some embodiments, if a user (or node computer) may be performing activity that may not be allowed by the provided policies, the gateway may terminate connections or overlay traffic tunnels associated with the out-of-policy activity.

Next, in one or more of the various embodiments, control may be returned to a calling process.

Figure 13:
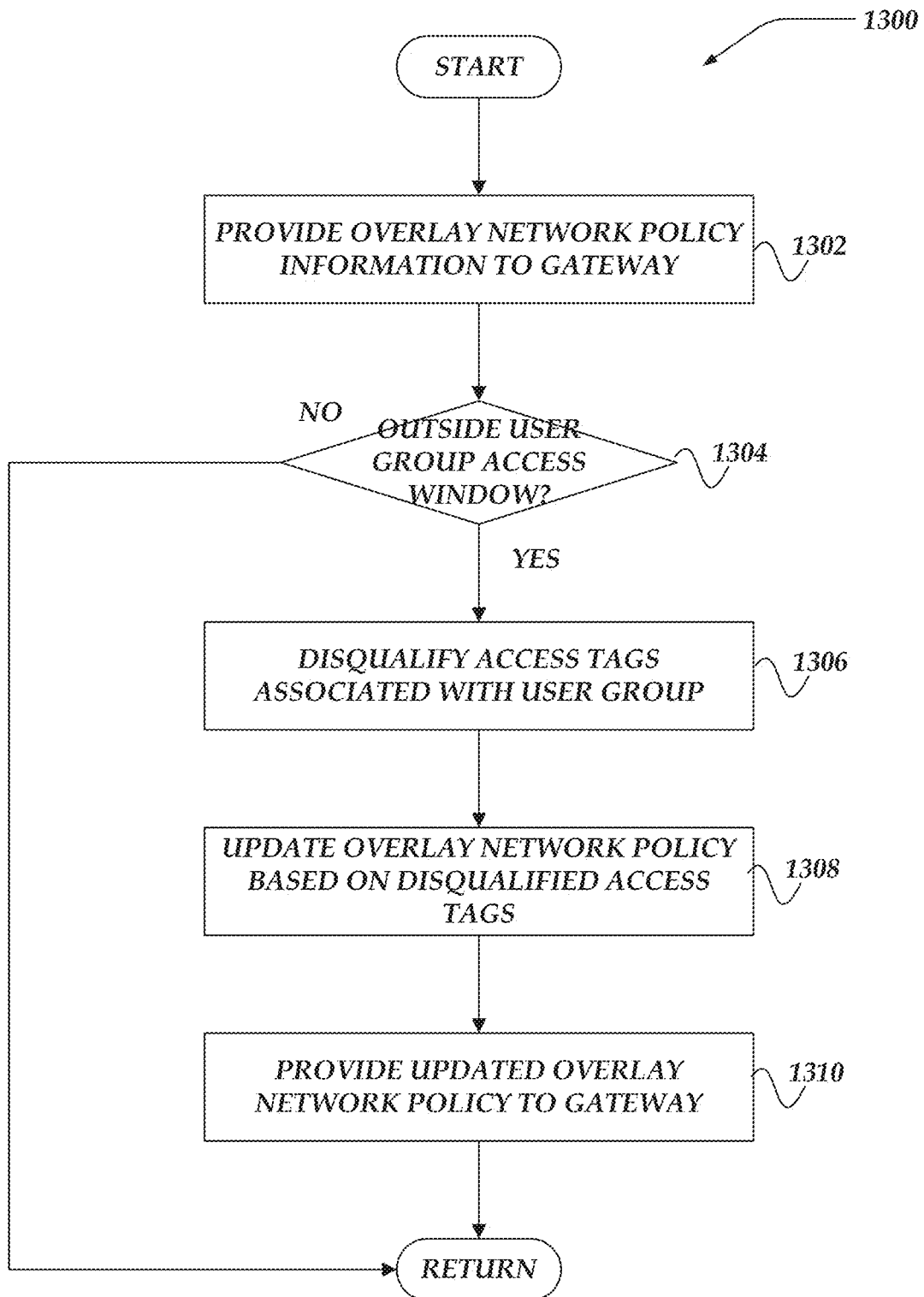
FIG. 13 illustrates a flowchart for a process for applying overlay network policy based on users in accordance with one or more of the various embodiments.

FIG. 13 illustrates a flowchart for process 1300 for applying overlay network policy based on users in accordance with one or more of the various embodiments. After a start block, at block 1302, in one or more of the various embodiments, a management platform engine may be arranged to provide overlay network policy information to the gateway associated with the logged in user. As described above, management platform engines may be arranged to generate overlay network policy information based on the user and provide it to the gateway engine the user has logged into to provide the user access to the overlay network. In some embodiments, as described above, this may be accomplished by associated the user with a user group that enables the particular overlay network policies to be applied for the user.

In one or more of the various embodiments, user groups may be associated with access windows that define time periods or time ranges that represent when the access tags in the user groups may be applied for generating overlay network policies.

At decision block 1304, in one or more of the various embodiments, if the current time may be outside of access windows associated with one or more of the user groups associated with the logged in user, control may flow to block 1306; otherwise, control may be returned to a calling process. In some embodiments, management platform engines may be arranged to automatically monitor access windows for user groups even if users in the user groups are not logged into the overlay network or otherwise active.

Also, in one or more of the various embodiments, gateway engines may be arranged to confirm that users may be operating in an access window as part of establishing or maintaining overlay traffic tunnels. For example, in some embodiments, gateway engines may be arranged to test access windows if a connection to resources in the overlay network may be attempted. Also, in some embodiments, gateway engine may be arranged to periodically sample its active connections to confirm associated users are operating within their access windows.

In one or more of the various embodiments, management platform engines may provide gateway engines a token that may be cryptographically signed by the management platform engine. Accordingly, in some embodiments, gateways engines may authenticate the token as being provided by the management platform. In some embodiments, tokens may be associated with a timeout for access based on the user authentication process. In some embodiments, valid/authenticated tokens must be shared during the creation of overlay tunnels. In some embodiments, target gateway computers will terminate communications if a token associated with an overlay tunnel times out.

At block 1306, in one or more of the various embodiments, the management platform engine may be arranged to disqualify one or more access tags associated with the one or more user groups that may be outside of their access window.

In one or more of the various embodiments, management platform engines may be arranged to determine the one or more access tags in the out-of-window user groups. Note, in some embodiments, access tags may be associated with two or more user groups. Accordingly, in some embodiments, disqualifying access tags in one user group may not disqualify the same access tags if they may also be associated with other user groups that remain within their access windows.

At block 1308, in one or more of the various embodiments, the management platform engine may be arranged to update the overlay network policy information based on the disqualified access tags.

In one or more of the various embodiments, management platform engines may be arranged to compare resource tags of the resource groups in the overlay network to the remaining access tags (qualified access tags) to determine if the gateway computer or gateway engine associated with the user may be added to them.

Accordingly, in some embodiments, management platform engines may be arranged to generate overlay network policies based on the resource groups the gateway computer or gateway engine may be included in.

At block 1310, in one or more of the various embodiments, the management platform engine may be arranged to provide the updated overlay network policy information to the gateway associated with the logged in user. As described above, management platform engines may be arranged to communicate overlay network policy information to the gateway computer or gateway engine over the underlay network using a control channel.

Accordingly, in response being provided updated overlay network policy information, gateway computers or gateway engines may begin enforcing the updated policies. In some embodiments, if a user is performing activity that may not be allowed by the updated policies, the gateway engine may terminate connections or overlay traffic tunnels associated with the out-of-access-window activity.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing communication over a network using one or more network computers that include one or more processors that perform actions, comprising:
   providing one or more credentials of a user to an authorization service on an underlay network, wherein the authorization service authenticates the user as a member of one or more authorization groups for the underlay network, and wherein the user is associated with a gateway on an overlay network;
   providing one or more user groups associated with the overlay network, wherein each user group is associated with one or more access tags, and wherein the one or more user groups for the overlay network are separate from the one or more authorization groups for the underlay network;
   providing one or more resource groups associated with one or more resources in the overlay network and one or more resource tags;
   comparing the one or more authorization groups with the one or more user groups to generate one or more affirmative first results based on an identifier of each authorization group;
   associating the user with each user group that corresponds to each affirmative first result;
   comparing the one or more access tags of each user group associated with the user to the one or more resource tags associated with each resource group to generate one or more affirmative second results;
   associating the gateway with each resource group that corresponds to the one or more affirmative second results;
   generating policy information for the gateway based on each resource group that is associated with the gateway;
   providing the policy information to the gateway to define one or more policies associated with the one or more resources in the overlay network;
   in response to a source node associated with the gateway providing overlay traffic directed to a target node in the overlay network, enforcing the one or more policies;
   associating an access time window with the one or more user groups; and
   in response to a current time being outside of the access time window, performing further actions, including:
      determining one or more disqualified access tags based on the one or more access tags that are associated with the one or more user groups associated with the access time window;
      determining one or more disqualified resource groups based on the one or more resource tags that correspond to the one or more disqualified access tags;
      updating the policy information for the gateway based on the one or more disqualified resource groups; and
      providing the updated policy information to the gateway over the underlay network.

2. The method of claim 1, wherein the authorization service is one or more of a Lightweight Directory Access Protocol (LDAP) service, a Security Assertion Markup Language (SAML) service, a Remote Authentication Dial-In User Service (RADIUS) service, a Kerberos-based service, an OpenID service, or an OAuth service.

3. The method of claim 1, wherein providing the one or more resource groups, further comprises:
- determining one or more nodes to include in each resource group based on one or more rules, one or more patterns, or one or more lists that determine one or more nodes to include in each resource group; and
- wherein including a node in a resource group includes the node in the overlay network, and wherein each resource group is associated with overlay network policy information that defines the overlay network access privileges for each node included in the one or more resource groups.

4. The method of claim 1, further comprising:
- providing the one or more credentials of the user to one or more other authorization services, wherein the one or more other authorization services authenticate the user as a member of one or more other authorization groups; and
- employing the one or more other authorization groups to determine or modify the one or more resource groups associated with the gateway.

5. The method of claim 1, further comprising:
- providing one or more other credentials of another user to the authorization service, wherein the authorization service authenticates the other user as a member of one or more other authorization groups;
- employing the one or more other authorization groups to determine one or more other resource groups associated with the gateway;
- updating the policy information for the gateway based on the one or more other resource groups; and
- providing the updated policy information to the gateway.

6. The method of claim 1, wherein associating the user with each user group that corresponds to each affirmative first result of the one or more affirmative first results, further comprises:
- associating the user with two or more user groups based on an association of each of the two or more user groups with a same authorization group; and
- associating two or more authorization groups with a same user group based on an association of the two or more authorization groups with the same user group.

7. A system for managing communication over one or more networks, comprising:
- one or more network computers, comprising:
  - a memory that stores at least instructions; and
  - one or more processors that execute the instructions that perform actions, including:
    - providing one or more credentials of a user to an authorization service on an underlay network, wherein the authorization service authenticates the user as a member of one or more authorization groups for the underlay network, and wherein the user is associated with a gateway on an overlay network;
    - providing one or more user groups associated with the overlay network, wherein each user group is associated with one or more access tags, and wherein the one or more user groups for the overlay network are separate from the one or more authorization groups for the underlay network;
    - providing one or more resource groups associated with one or more resources in the overlay network and one or more resource tags;
    - comparing the one or more authorization groups with the one or more user groups to generate one or more affirmative first results based on an identifier of each authorization group;
    - associating the user with each user group that corresponds to each affirmative first result;
    - comparing the one or more access tags of each user group associated with the user to the one or more resource tags associated with each resource group to generate one or more affirmative second results;
    - associating the gateway with each resource group that corresponds to the one or more affirmative second results;
    - generating policy information for the gateway based on each resource group that is associated with the gateway;
    - providing the policy information to the gateway to define one or more policies associated with the one or more resources in the overlay network;
    - in response to a source node associated with the gateway providing overlay traffic directed to a target node in the overlay network, enforcing the one or more policies;
    - associating an access time window with the one or more user groups; and
    - in response to a current time being outside of the access time window, performing further actions, including:
      - determining one or more disqualified access tags based on the one or more access tags that are associated with the one or more user groups associated with the access time window;
      - determining one or more disqualified resource groups based on the one or more resource tags that correspond to the one or more disqualified access tags;
      - updating the policy information for the gateway based on the one or more disqualified resource groups; and
      - providing the updated policy information to the gateway over the underlay network; and
- one or more client computers, comprising:
  - a memory that stores at least instructions; and
  - one or more processors that execute instructions that perform actions, including:
    - collecting the one or more credentials from the user.

8. The system of claim 7, wherein the authorization service is one or more of a Lightweight Directory Access Protocol (LDAP) service, a Security Assertion Markup Language (SAML) service, a Remote Authentication Dial-In User Service (RADIUS) service, a Kerberos-based service, an OpenID service, or an OAuth service.

9. The system of claim 7, wherein providing the one or more resource groups, further comprises:
- determining one or more nodes to include in each resource group based on one or more rules, one or more patterns, or one or more lists that determine one or more nodes to include in each resource group; and
- wherein including a node in a resource group includes the node in the overlay network, and wherein each resource group is associated with overlay network policy information that defines the overlay network access privileges for each node included in the one or more resource groups.

10. The system of claim 7, wherein the one or more processors of the network computer execute the instructions that perform further actions, comprising:
- providing the one or more credentials of the user to one or more other authorization services, wherein the one or more other authorization services authenticate the user as a member of one or more other authorization groups; and employing the one or more other authorization groups to determine or modify the one or more resource groups associated with the gateway.

11. The system of claim 7, wherein the one or more processors of the network computer execute the instructions that perform further actions, comprising:

providing one or more other credentials of another user to the authorization service, wherein the authorization service authenticates the other user as a member of one or more other authorization groups;

employing the one or more other authorization groups to determine one or more other resource groups associated with the gateway;

updating the policy information for the gateway based on the one or more other resource groups; and providing the updated policy information to the gateway.

12. The system of claim 7, wherein associating the user with each user group that corresponds to each affirmative first result of the one or more affirmative first results, further comprises:

associating the user with two or more user groups based on an association of each of the two or more user groups with a same authorization group; and associating two or more authorization groups with a same user group based on an association of the two or more authorization groups with the same user group.

13. A processor readable non-transitory storage media that includes instructions for managing communication over one or more networks, wherein execution of the instructions by the one or more network computers perform the method comprising:

providing one or more credentials of a user to an authorization service on an underlay network, wherein the authorization service authenticates the user as a member of one or more authorization groups for the underlay network, and wherein the user is associated with a gateway on an overlay network;

providing one or more user groups associated with the overlay network, wherein each user group is associated with one or more access tags, and wherein the one or more user groups for the overlay network are separate from the one or more authorization groups for the underlay network;

providing one or more resource groups associated with one or more resources in the overlay network and one or more resource tags;

comparing the one or more authorization groups with the one or more user groups to generate one or more affirmative first results based on an identifier of each authorization group;

associating the user with each user group that corresponds to each affirmative first result;

comparing the one or more access tags of each user group associated with the user to the one or more resource tags associated with each resource group to generate one or more affirmative second results;

associating the gateway with each resource group that corresponds to the one or more affirmative second results;

generating policy information for the gateway based on each resource group that is associated with the gateway;

providing the policy information to the gateway to define one or more policies associated with the one or more resources in the overlay network;

in response to a source node associated with the gateway providing overlay traffic directed to a target node in the overlay network, enforcing the one or more policies associating an access time window with the one or more user groups; and in response to a current time being outside of the access time window, performing further actions, including:

determining one or more disqualified access tags based on the one or more access tags that are associated with the one or more user groups associated with the access time window;

determining one or more disqualified resource groups based on the one or more resource tags that correspond to the one or more disqualified access tags;

updating the policy information for the gateway based on the one or more disqualified resource groups; and providing the updated policy information to the gateway over the underlay network.

14. The media of claim 13, wherein the authorization service is one or more of a Lightweight Directory Access Protocol (LDAP) service, a Security Assertion Markup Language (SAML) service, a Remote Authentication Dial-In User Service (RADIUS) service, a Kerberos-based service, an OpenID service, or an OAuth service.

15. The media of claim 13, wherein providing the one or more resource groups, further comprises:

determining one or more nodes to include in each resource group based on one or more rules, one or more patterns, or one or more lists that determine one or more nodes to include in each resource group; and wherein including a node in a resource group includes the node in the overlay network, and wherein each resource group is associated with overlay network policy information that defines the overlay network access privileges for each node included in the one or more resource groups.

16. The media of claim 13, further comprising:

providing the one or more credentials of the user to one or more other authorization services, wherein the one or more other authorization services authenticate the user as a member of one or more other authorization groups; and employing the one or more other authorization groups to determine or modify the one or more resource groups associated with the gateway.

17. The media of claim 13, further comprising:

providing one or more other credentials of another user to the authorization service, wherein the authorization service authenticates the other user as a member of one or more other authorization groups;

employing the one or more other authorization groups to determine one or more other resource groups associated with the gateway;

updating the policy information for the gateway based on the one or more other resource groups; and providing the updated policy information to the gateway.

18. The media of claim 13, wherein associating the user with each user group that corresponds to each affirmative first result of the one or more affirmative first results, further comprises:

associating the user with two or more user groups based on an association of each of the two or more user groups with a same authorization group; and associating two or more authorization groups with a same user group based on an association of the two or more authorization groups with the same user group.

19. A network computer for managing communication over one or more networks, comprising:
 a memory that stores at least instructions; and
 one or more processors that execute the instructions that perform actions, including:
  providing one or more credentials of a user to an authorization service on an underlay network, wherein the authorization service authenticates the user as a member of one or more authorization groups for the underlay network, and wherein the user is associated with a gateway on an overlay network;
  providing one or more user groups associated with the overlay network, wherein each user group is associated with one or more access tags, and wherein the one or more user groups for the overlay network are separate from the one or more authorization groups for the underlay network;
  providing one or more resource groups associated with one or more resources in the overlay network and one or more resource tags;
  comparing the one or more authorization groups with the one or more user groups to generate one or more affirmative first results based on an identifier of each authorization group;
  associating the user with each user group that corresponds to each affirmative first result;
  comparing the one or more access tags of each user group associated with the user to the one or more resource tags associated with each resource group to generate one or more affirmative second results;
  associating the gateway with each resource group that corresponds to the one or more affirmative second results;
  generating policy information for the gateway based on each resource group that is associated with the gateway;
  providing the policy information to the gateway to define one or more policies associated with the one or more resources in the overlay network;
  in response to a source node associated with the gateway providing overlay traffic directed to a target node in the overlay network, enforcing the one or more policies
  associating an access time window with the one or more user groups; and
  in response to a current time being outside of the access time window, performing further actions, including:
   determining one or more disqualified access tags based on the one or more access tags that are associated with the one or more user groups associated with the access time window;
   determining one or more disqualified resource groups based on the one or more resource tags that correspond to the one or more disqualified access tags;
   updating the policy information for the gateway based on the one or more disqualified resource groups; and
   providing the updated policy information to the gateway over the underlay network.

20. The network computer of claim 19, wherein the authorization service is one or more of a Lightweight Directory Access Protocol (LDAP) service, a Security Assertion Markup Language (SAML) service, a Remote Authentication Dial-In User Service (RADIUS) service, a Kerberos-based service, an OpenID service, or an OAuth service.

21. The network computer of claim 19, wherein providing the one or more resource groups, further comprises:
 determining one or more nodes to include in each resource group based on one or more rules, one or more patterns, or one or more lists that determine one or more nodes to include in each resource group; and
 wherein including a node in a resource group includes the node in the overlay network, and wherein each resource group is associated with overlay network policy information that defines the overlay network access privileges for each node included in the one or more resource groups.

22. The network computer of claim 19, further comprising:
 providing the one or more credentials of the user to one or more other authorization services, wherein the one or more other authorization services authenticate the user as a member of one or more other authorization groups; and
 employing the one or more other authorization groups to determine or modify the one or more resource groups associated with the gateway.

23. The network computer of claim 19, further comprising:
 providing one or more other credentials of another user to the authorization service, wherein the authorization service authenticates the other user as a member of one or more other authorization groups;
 employing the one or more other authorization groups to determine one or more other resource groups associated with the gateway;
 updating the policy information for the gateway based on the one or more other resource groups; and
 providing the updated policy information to the gateway.

24. The network computer of claim 19, wherein associating the user with each user group that corresponds to each affirmative first result of the one or more affirmative first results, further comprises:
 associating the user with two or more user groups based on an association of each of the two or more user groups with a same authorization group; and
 associating two or more authorization groups with a same user group based on an association of the two or more authorization groups with the same user group.

* * * * *